March 31, 1964  S. H. A. YOUNG  3,127,307
METHOD OF MOLDING SHAPED ARTICLES FROM
FLUID FIBROUS SUSPENSIONS
Original Filed Oct. 1, 1956  20 Sheets-Sheet 10
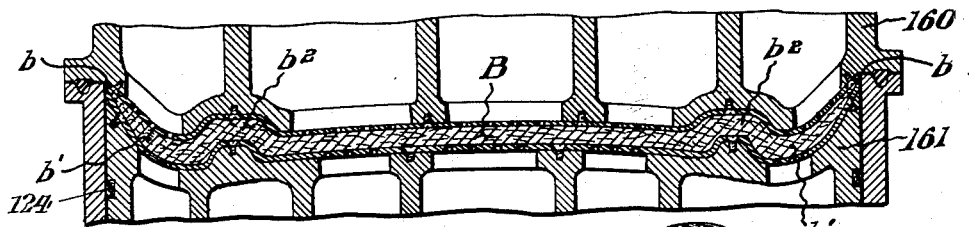
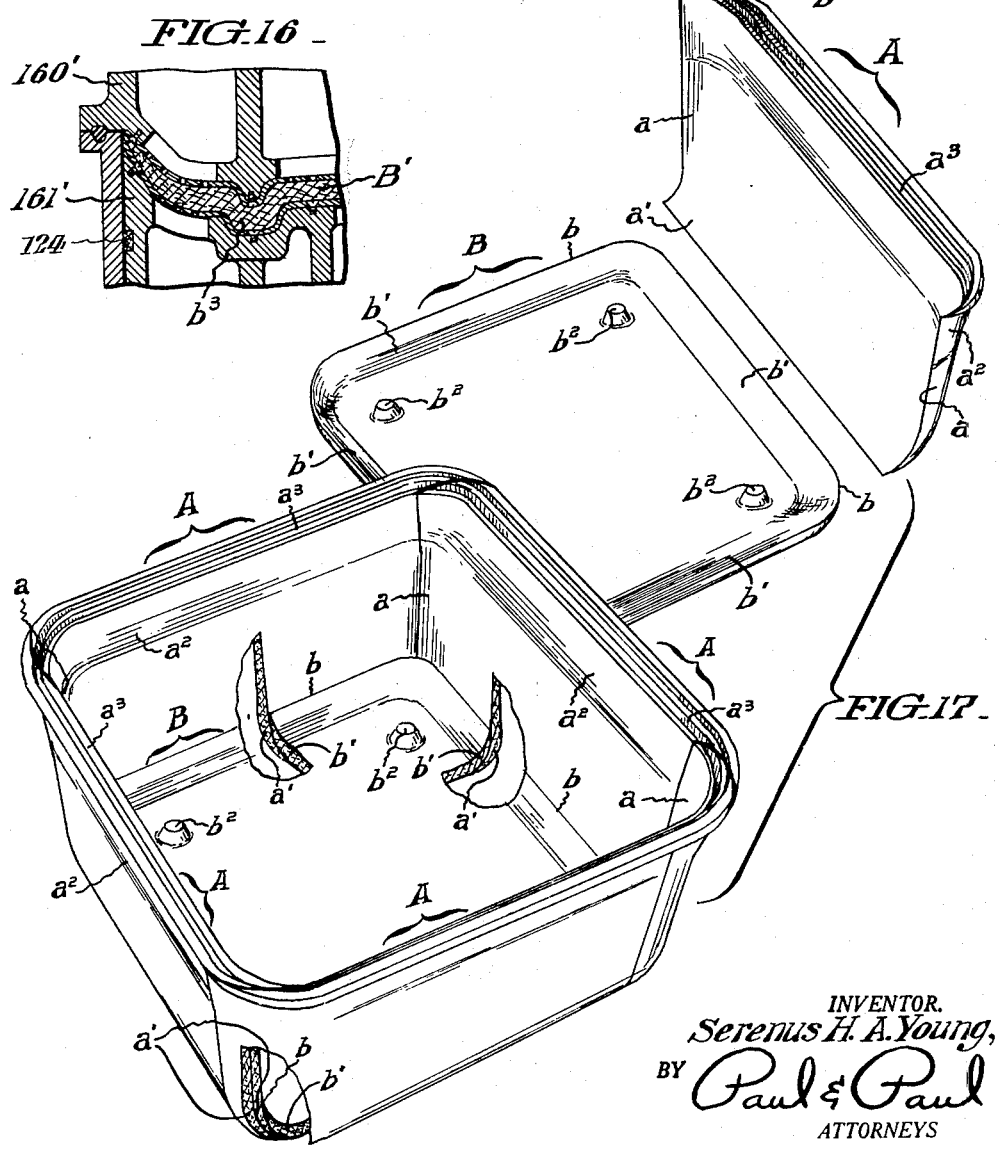
INVENTOR.
Serenus H. A. Young,
BY Paul & Paul
ATTORNEYS

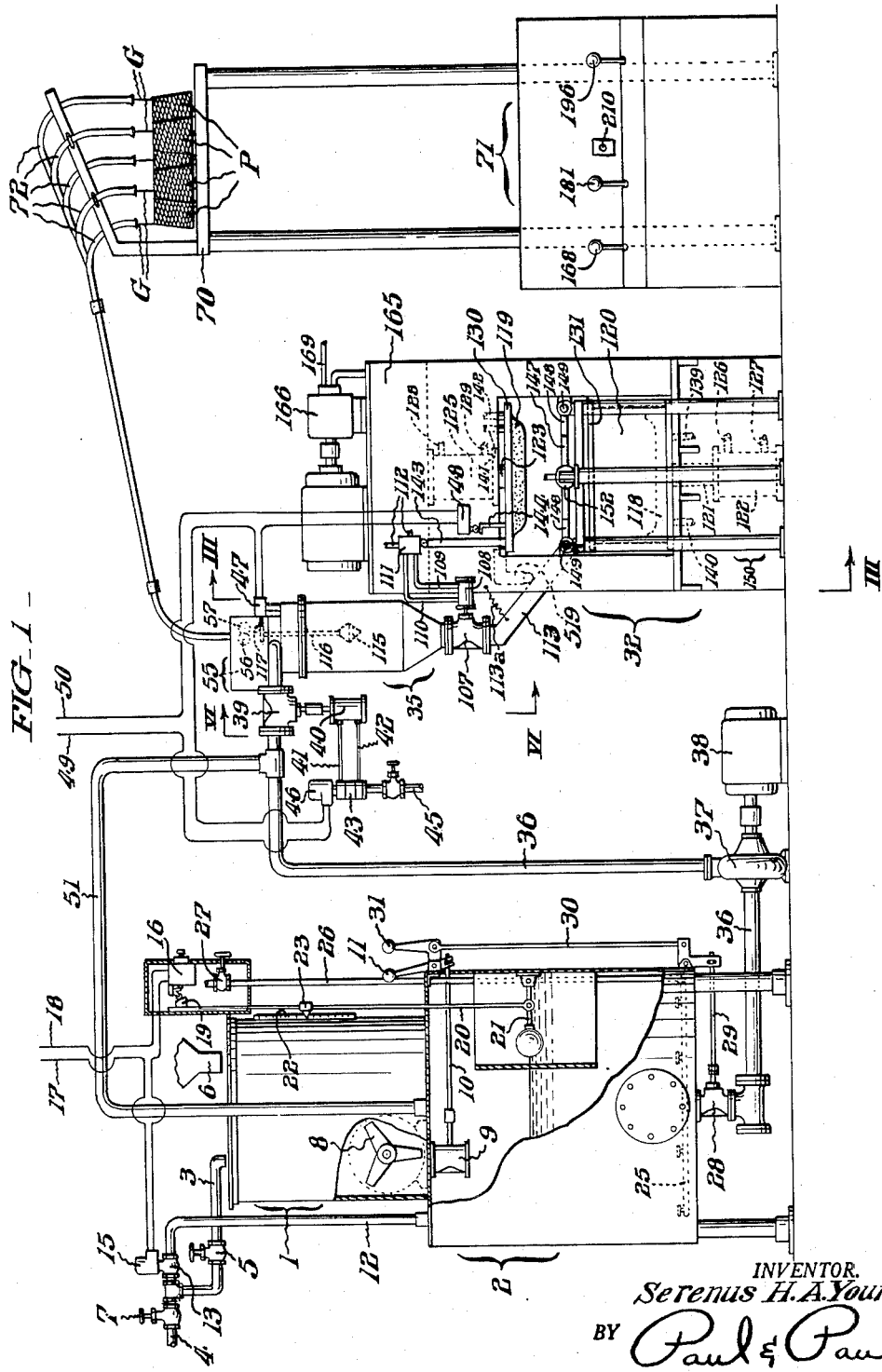

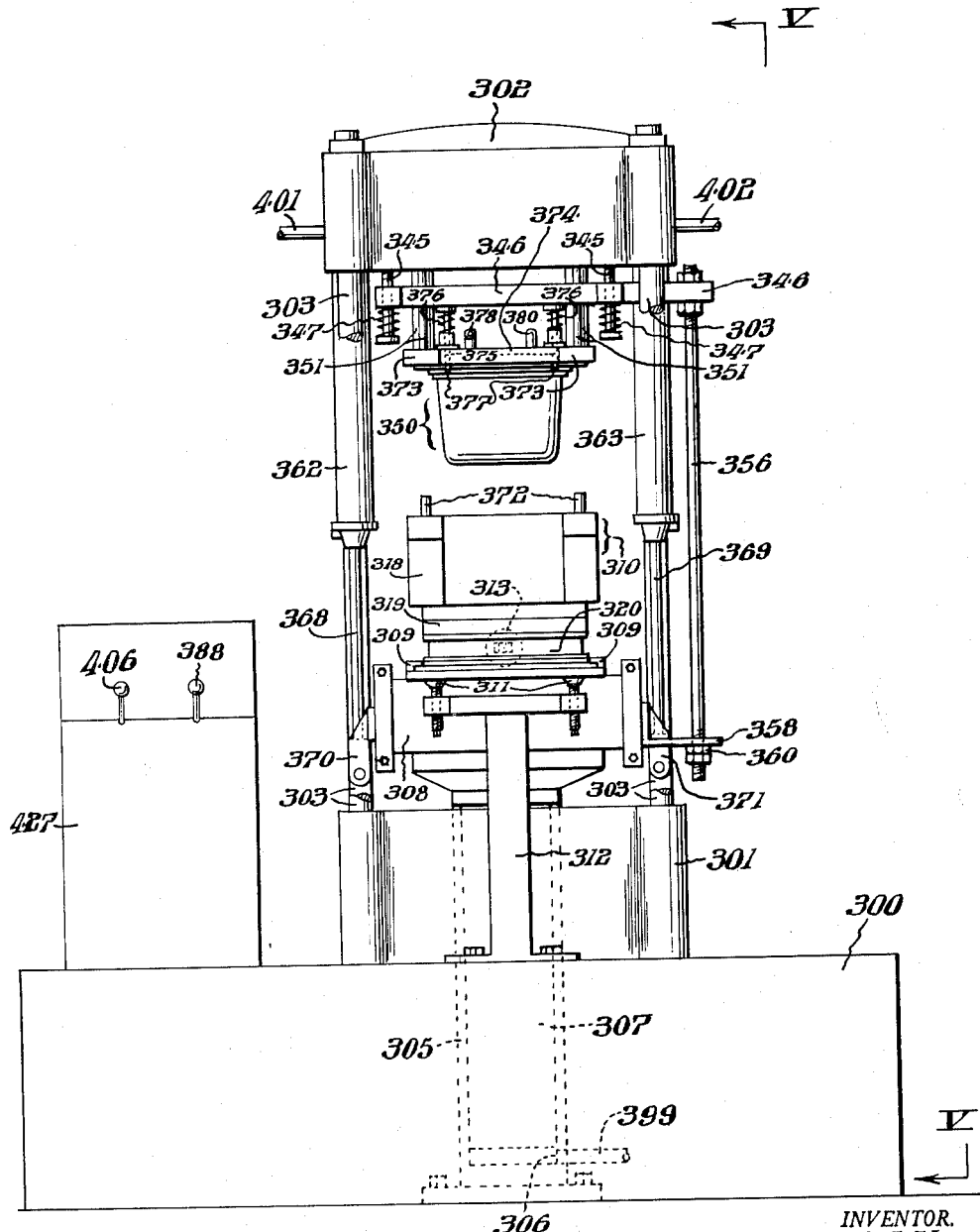

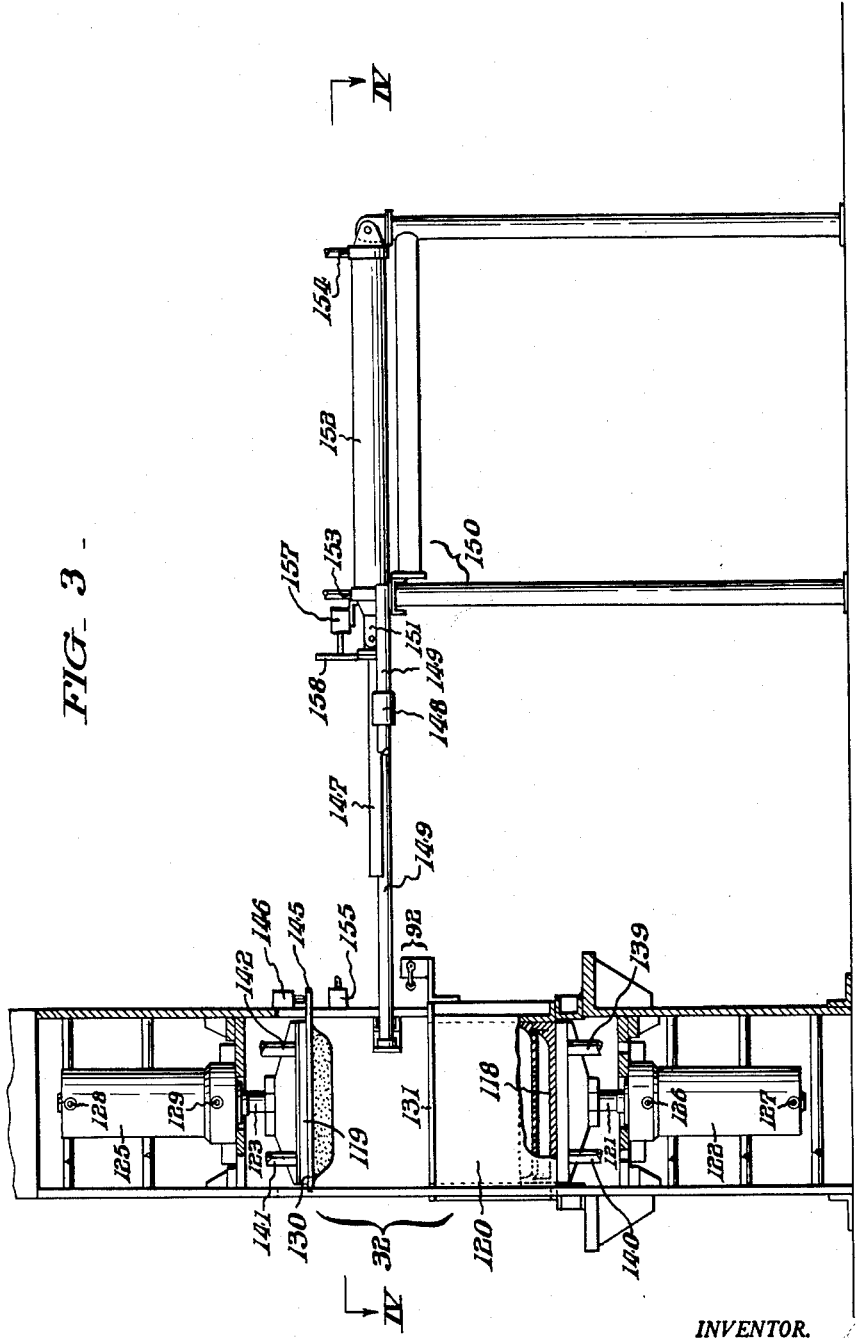

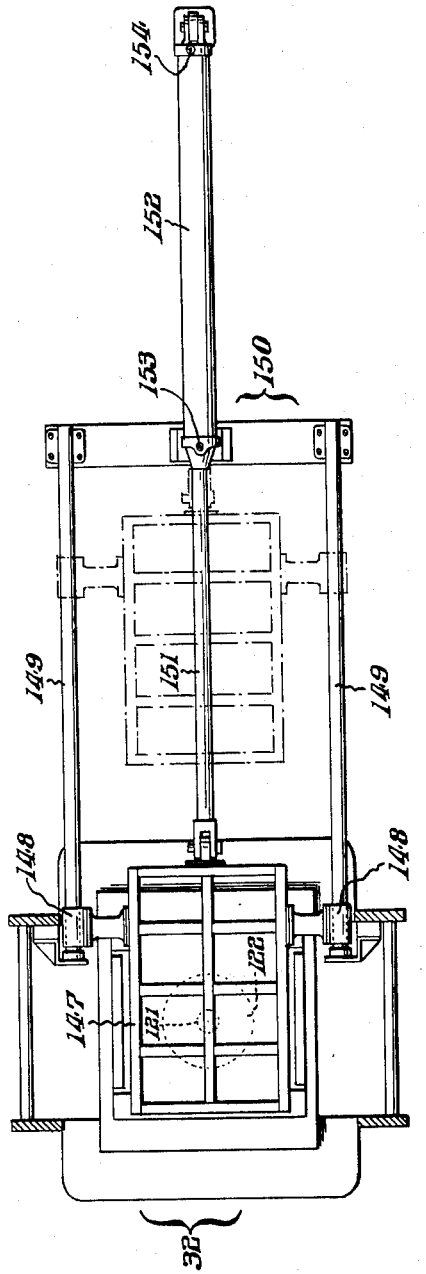

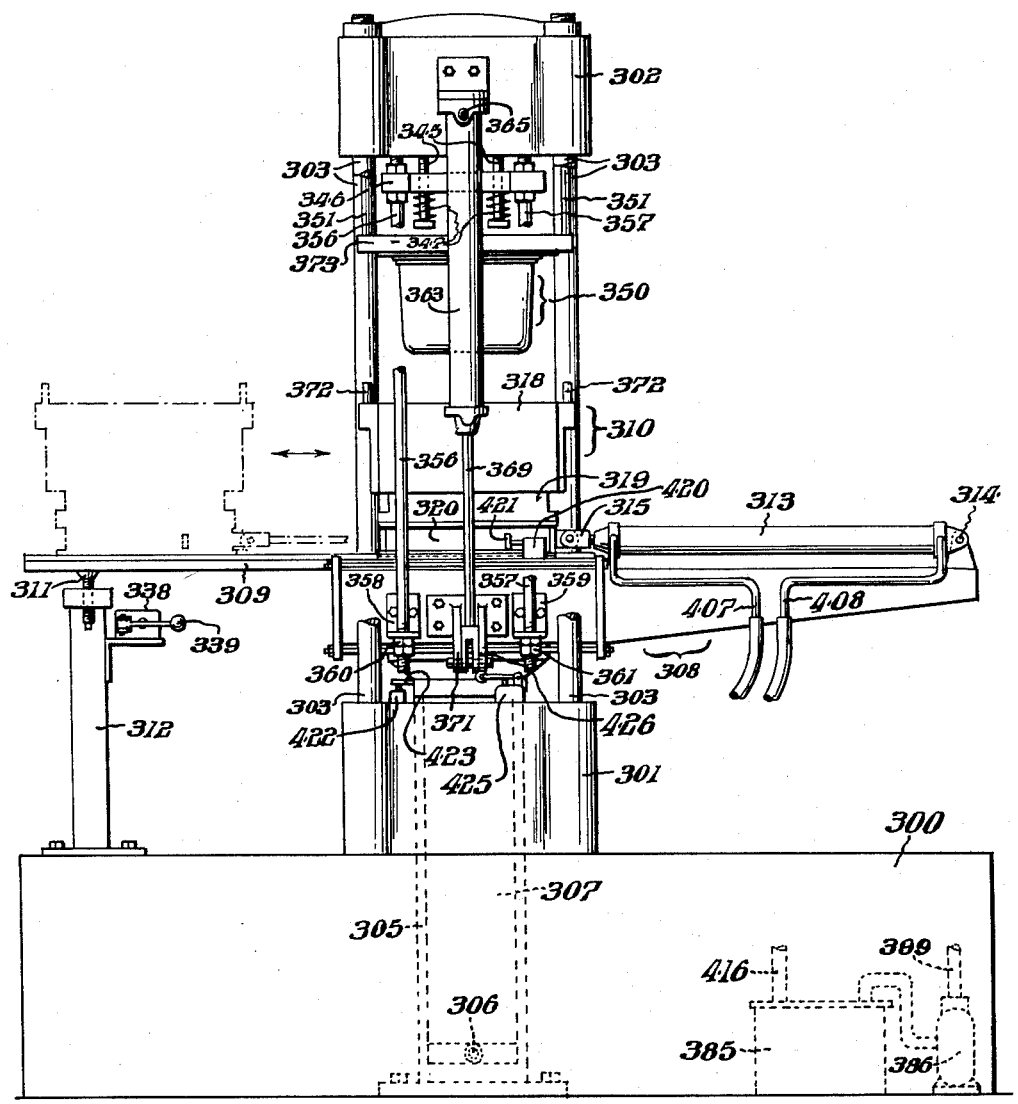

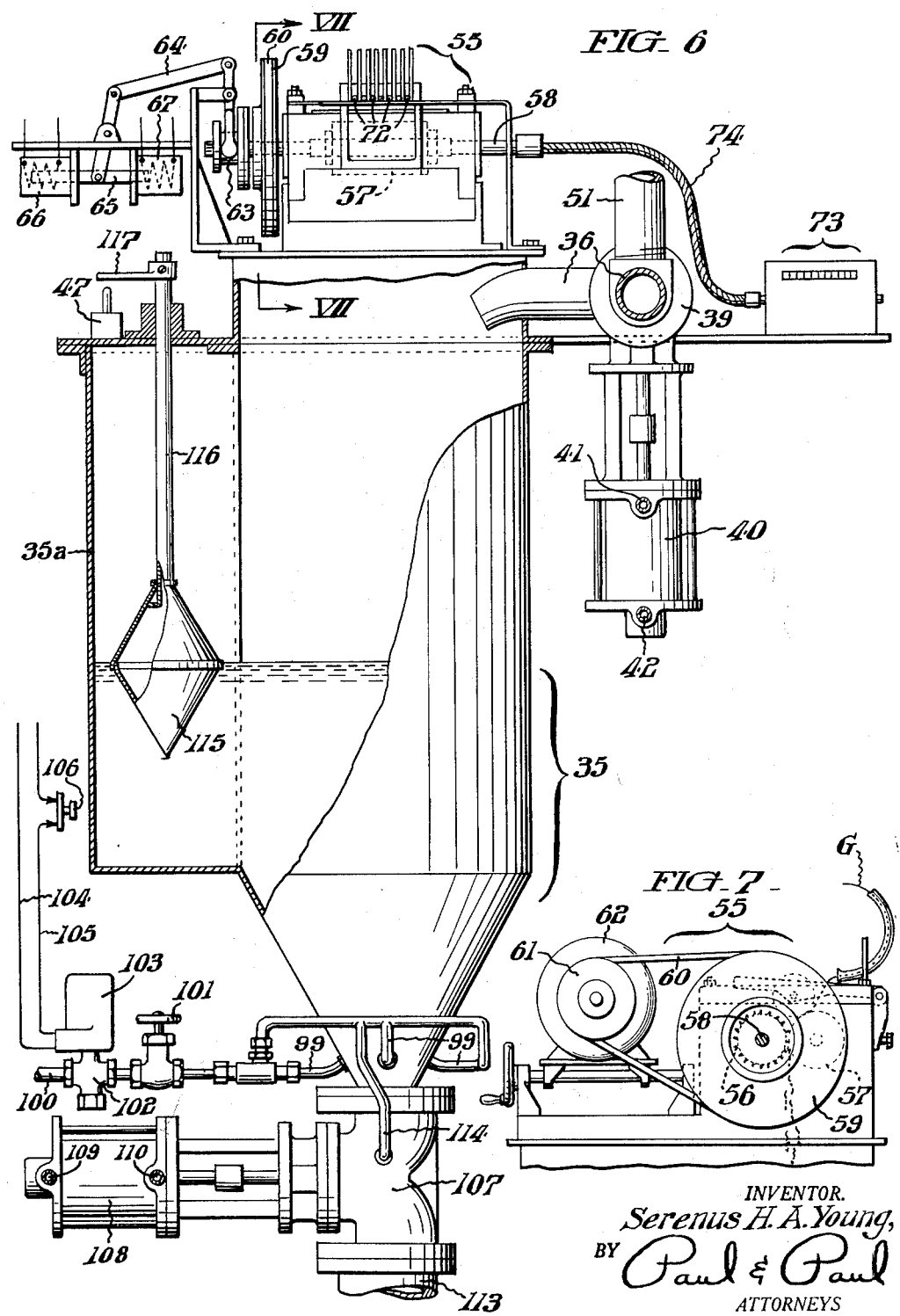

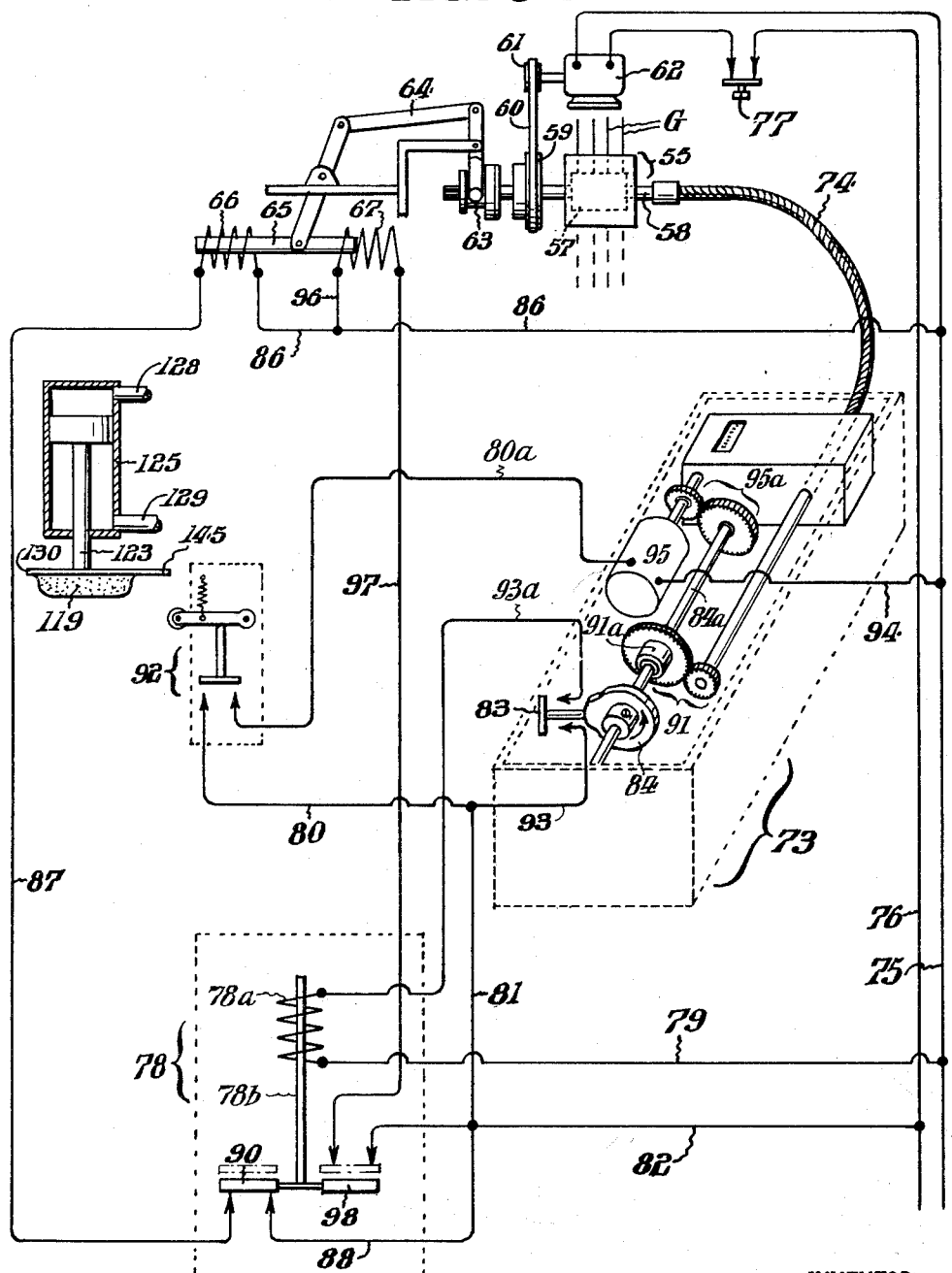

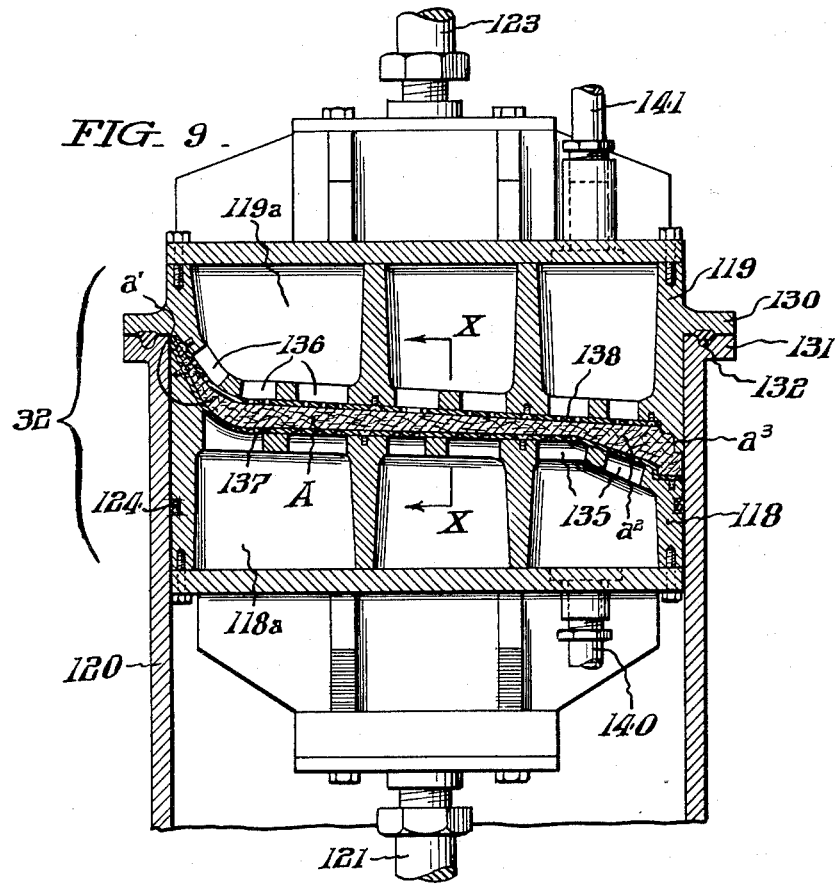
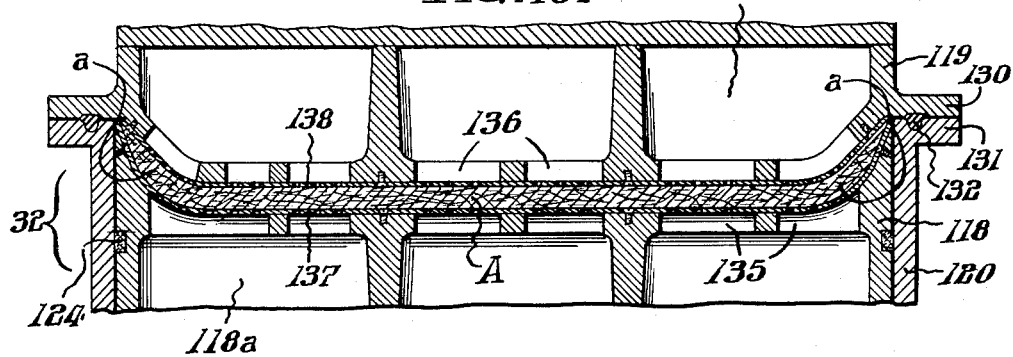

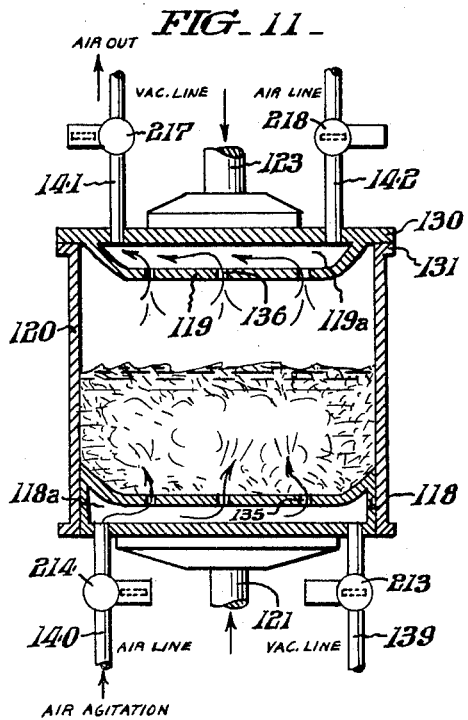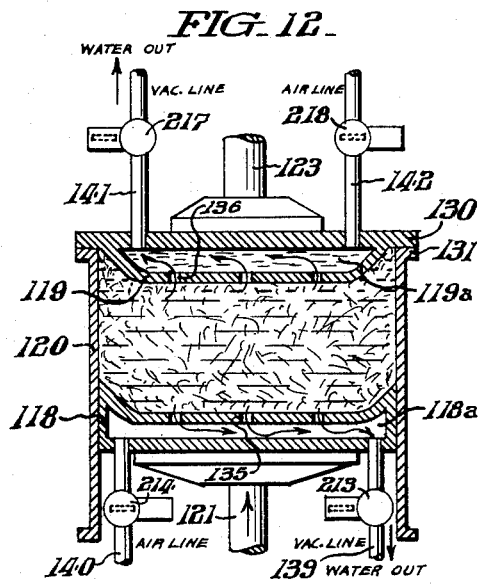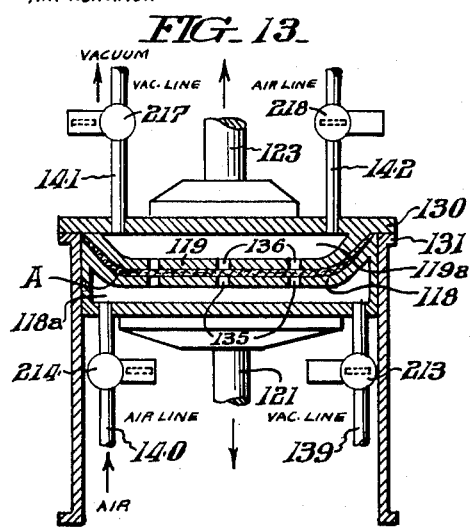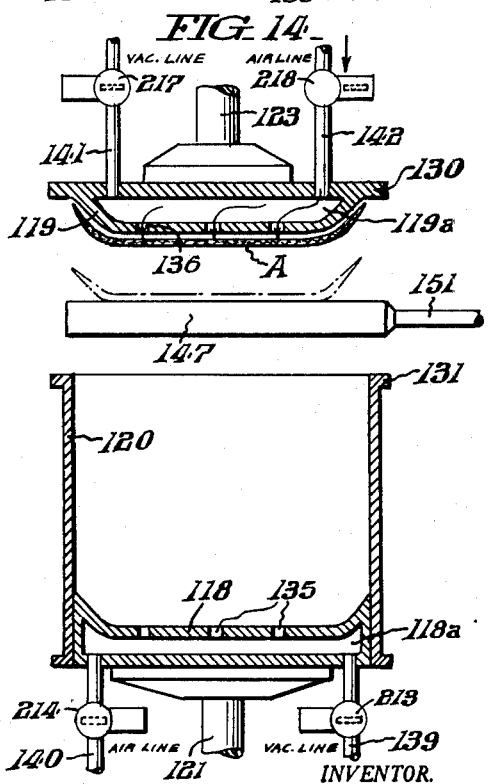

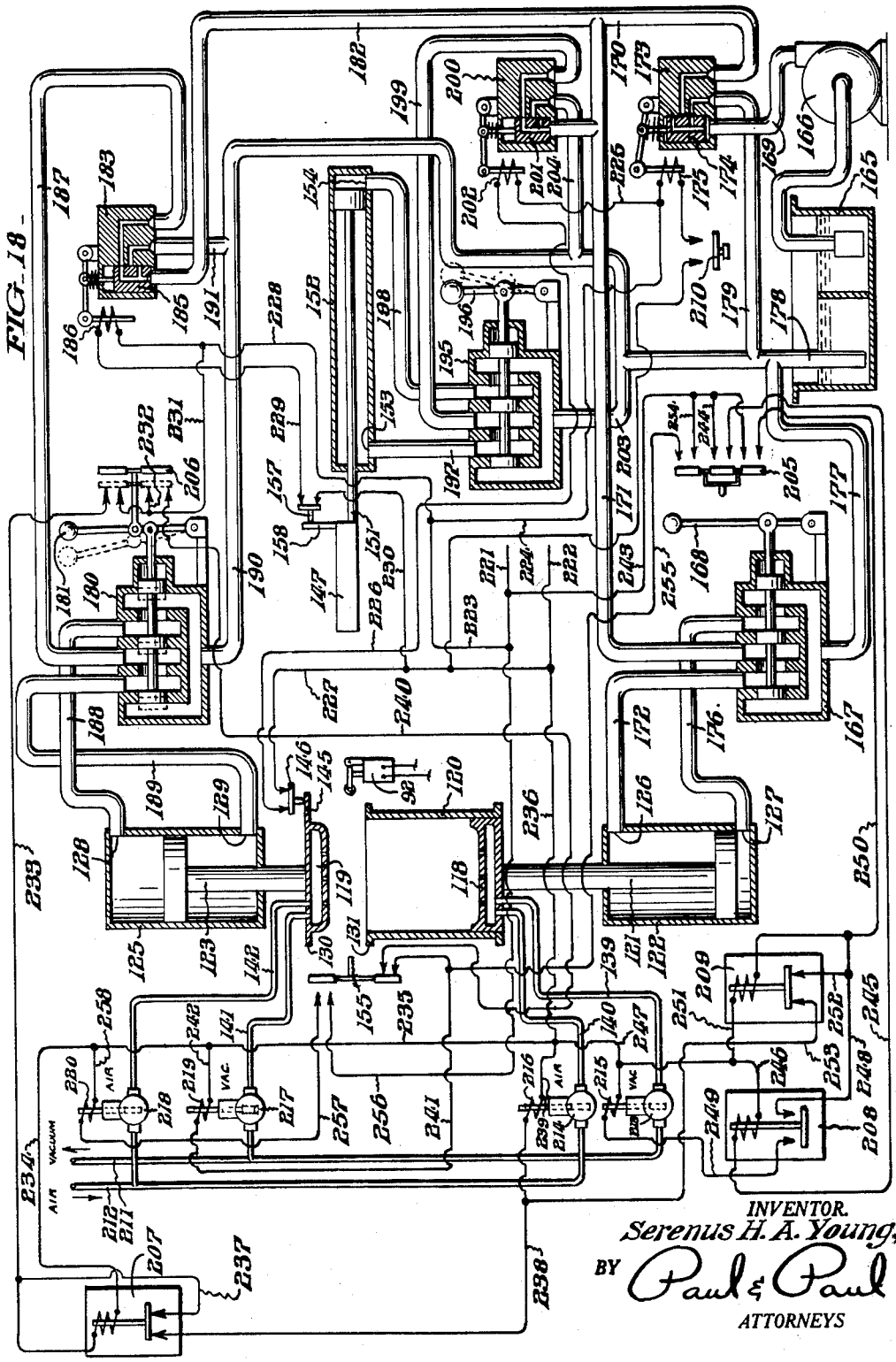

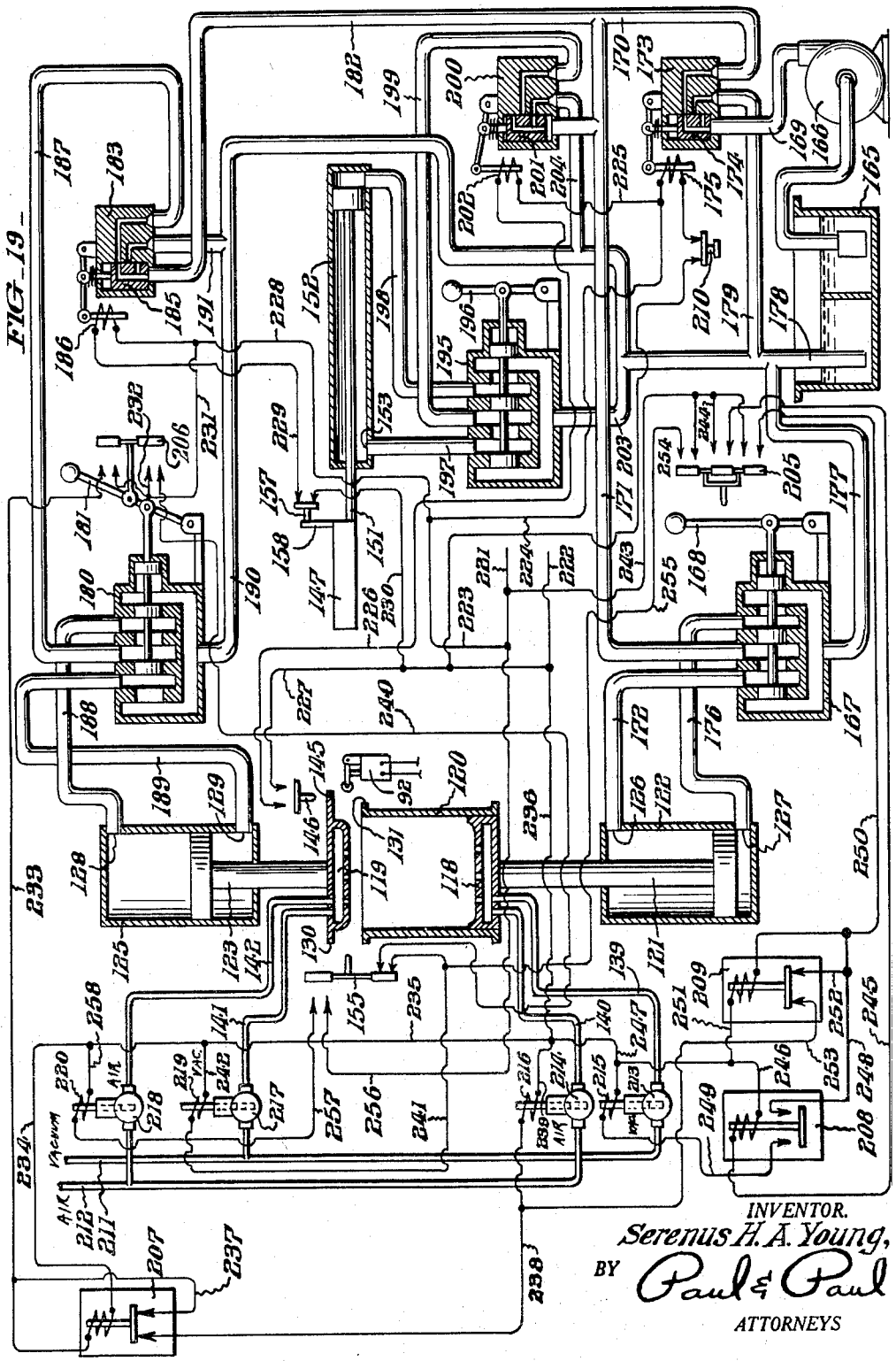

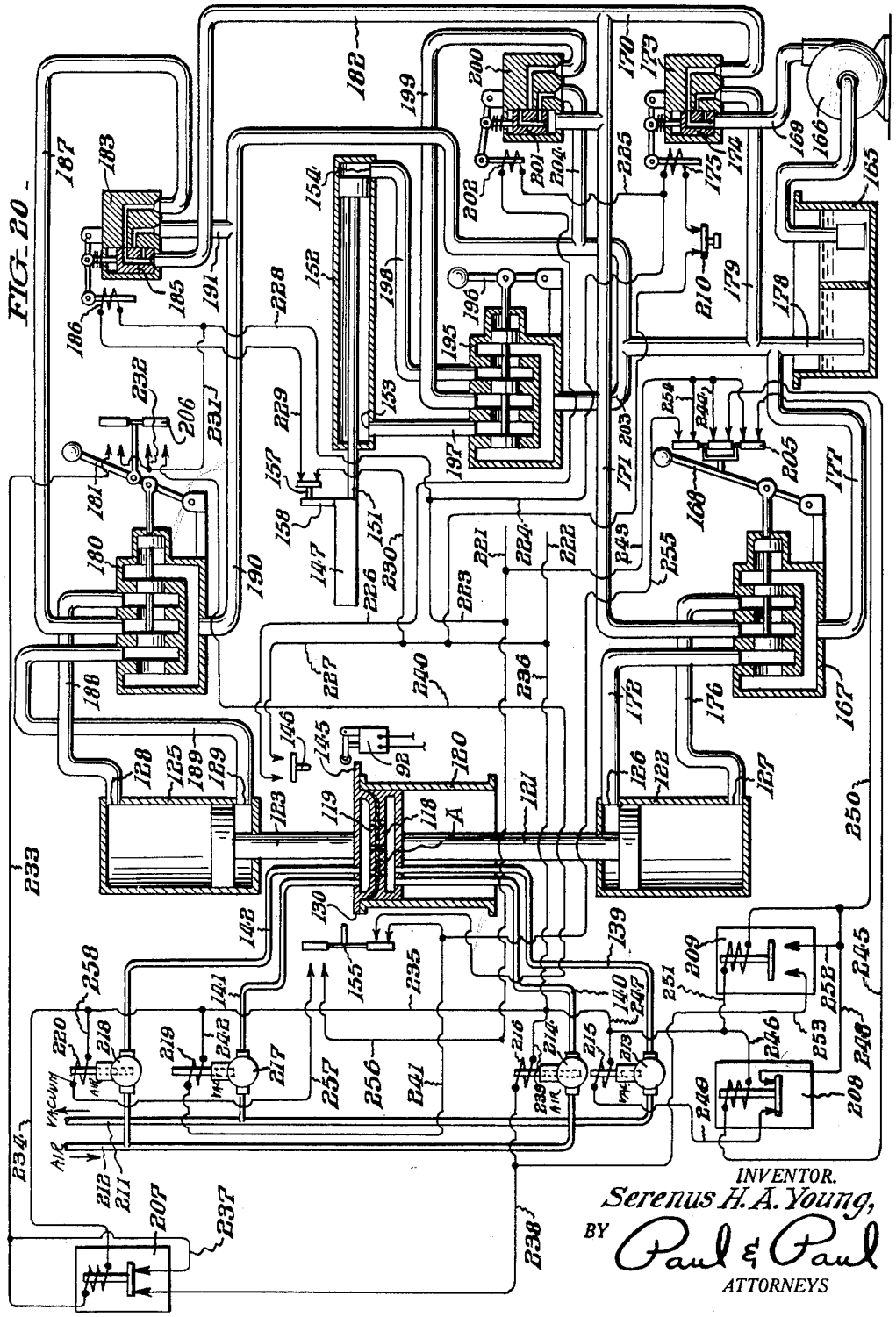

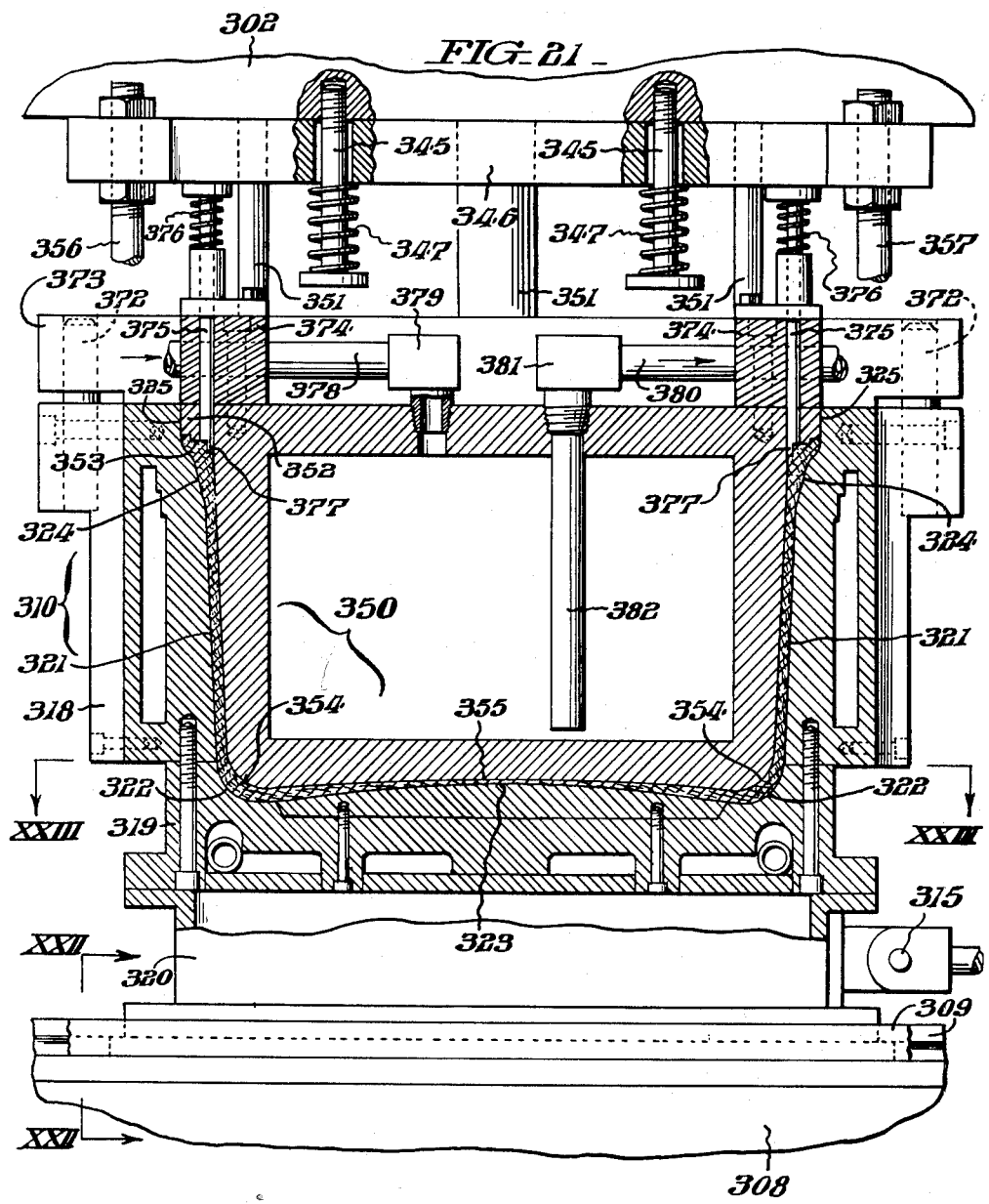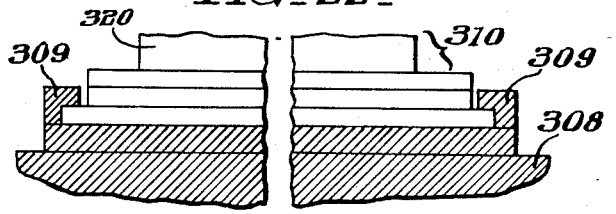

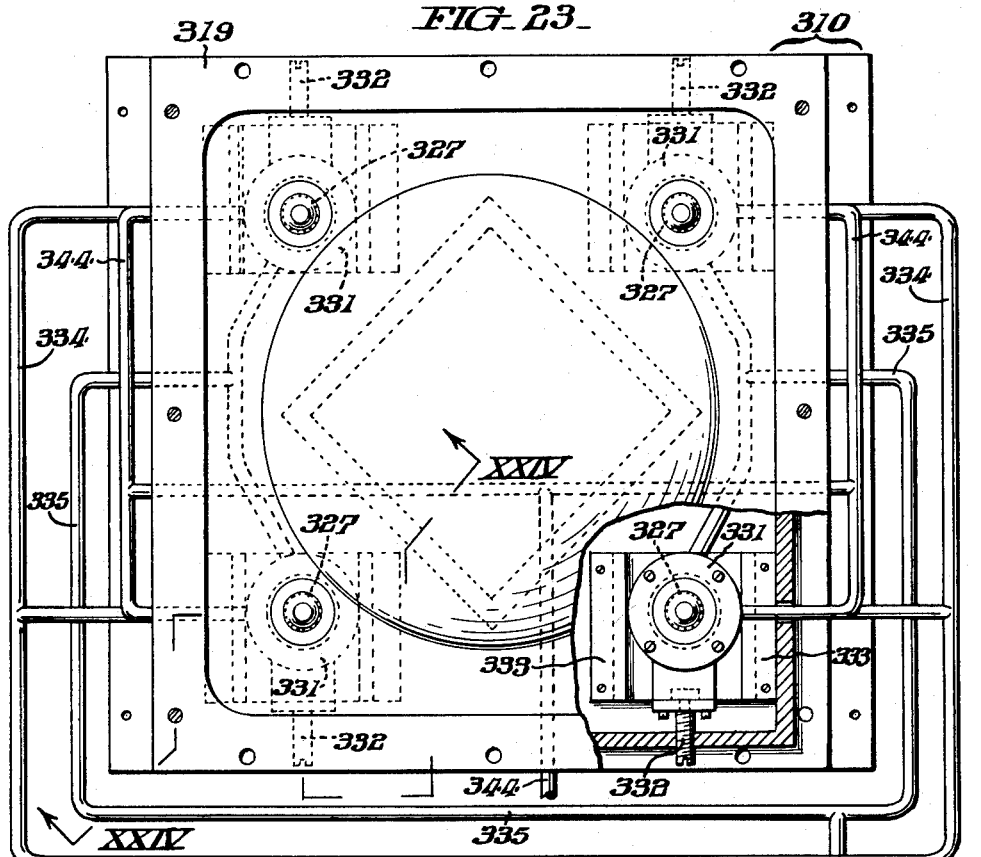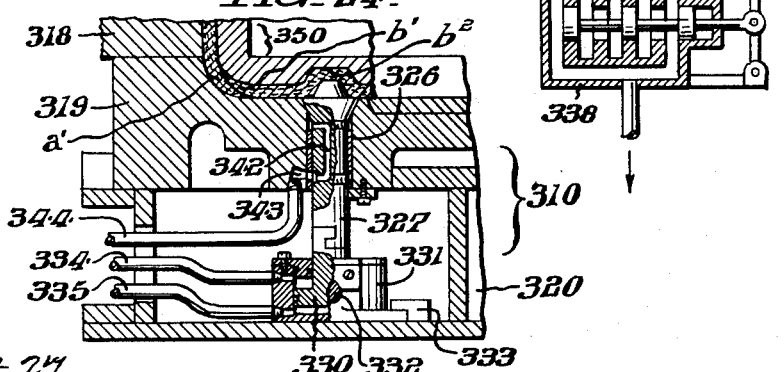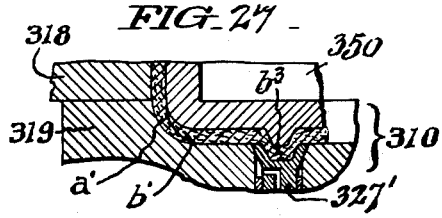

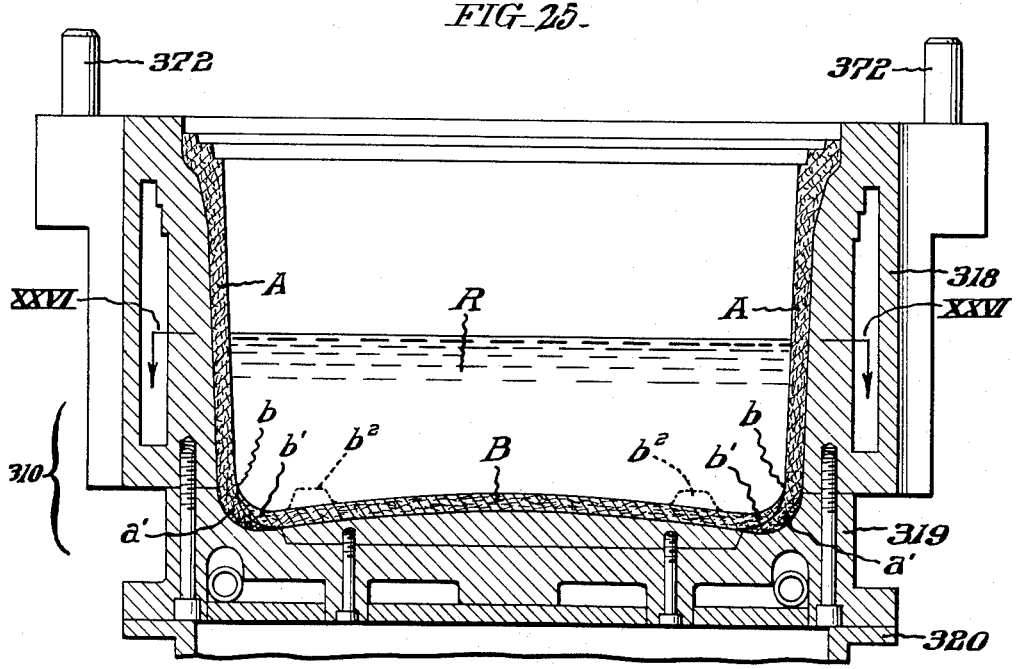
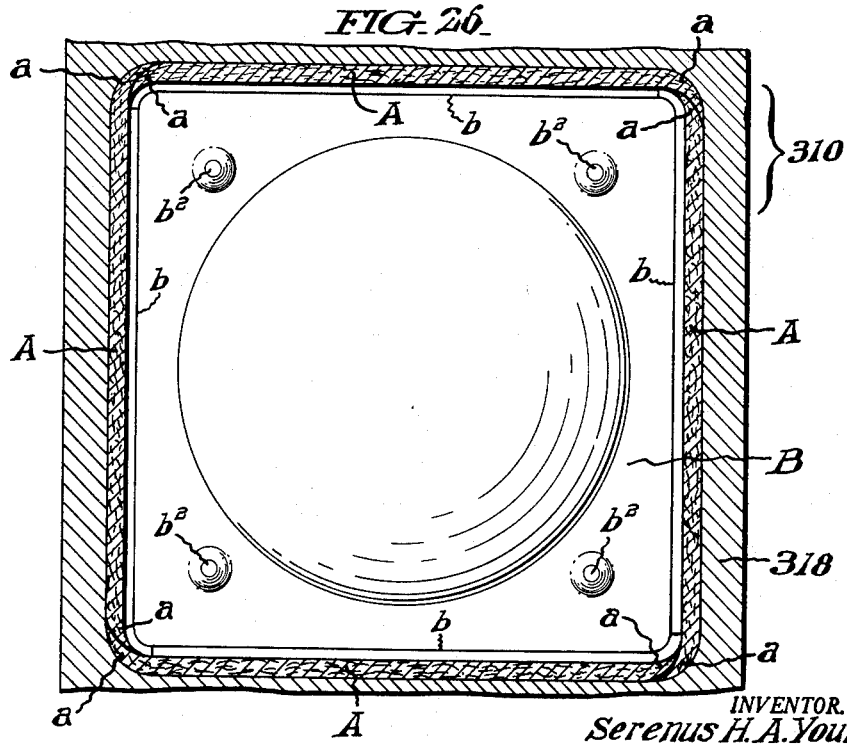

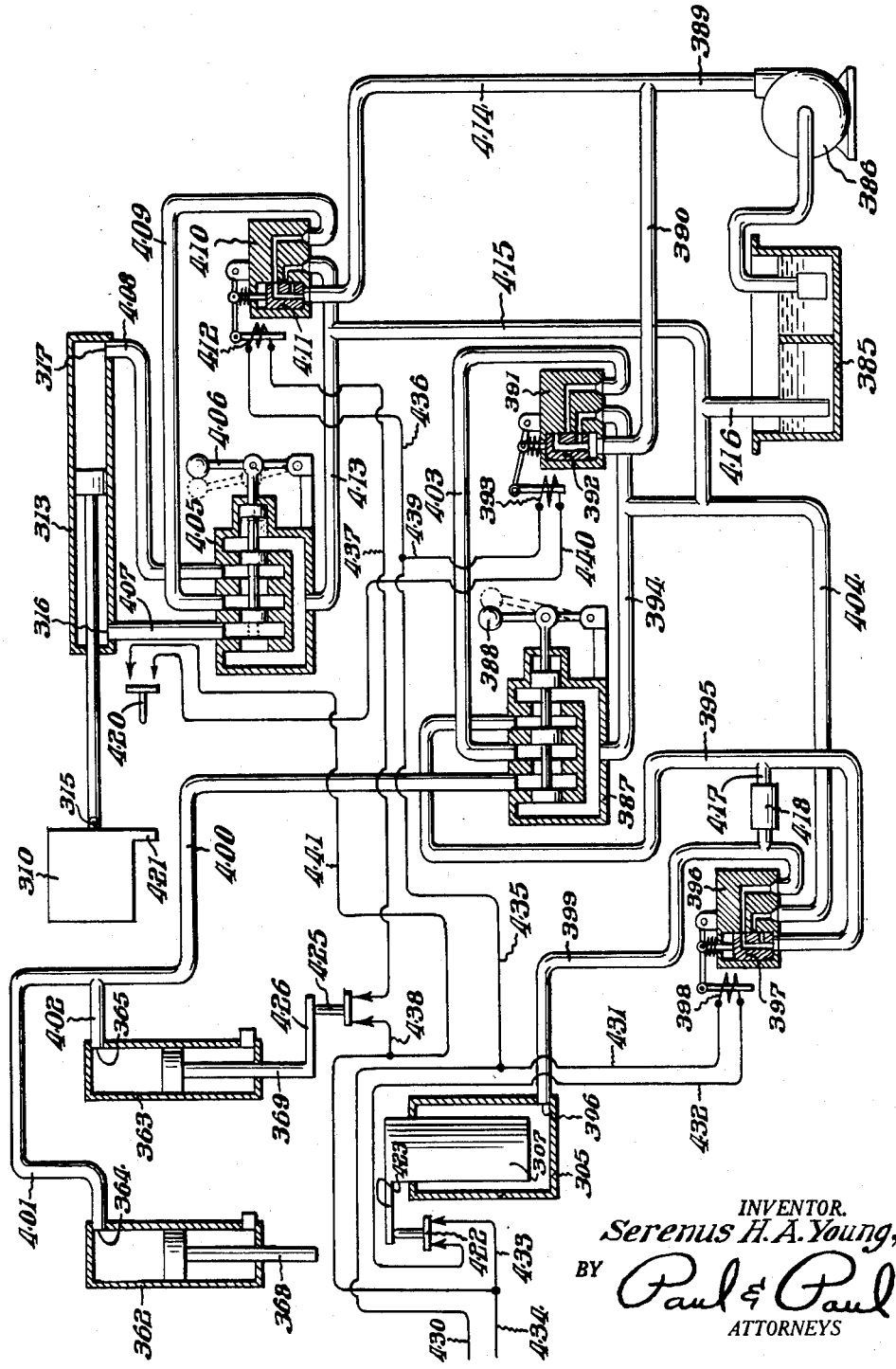

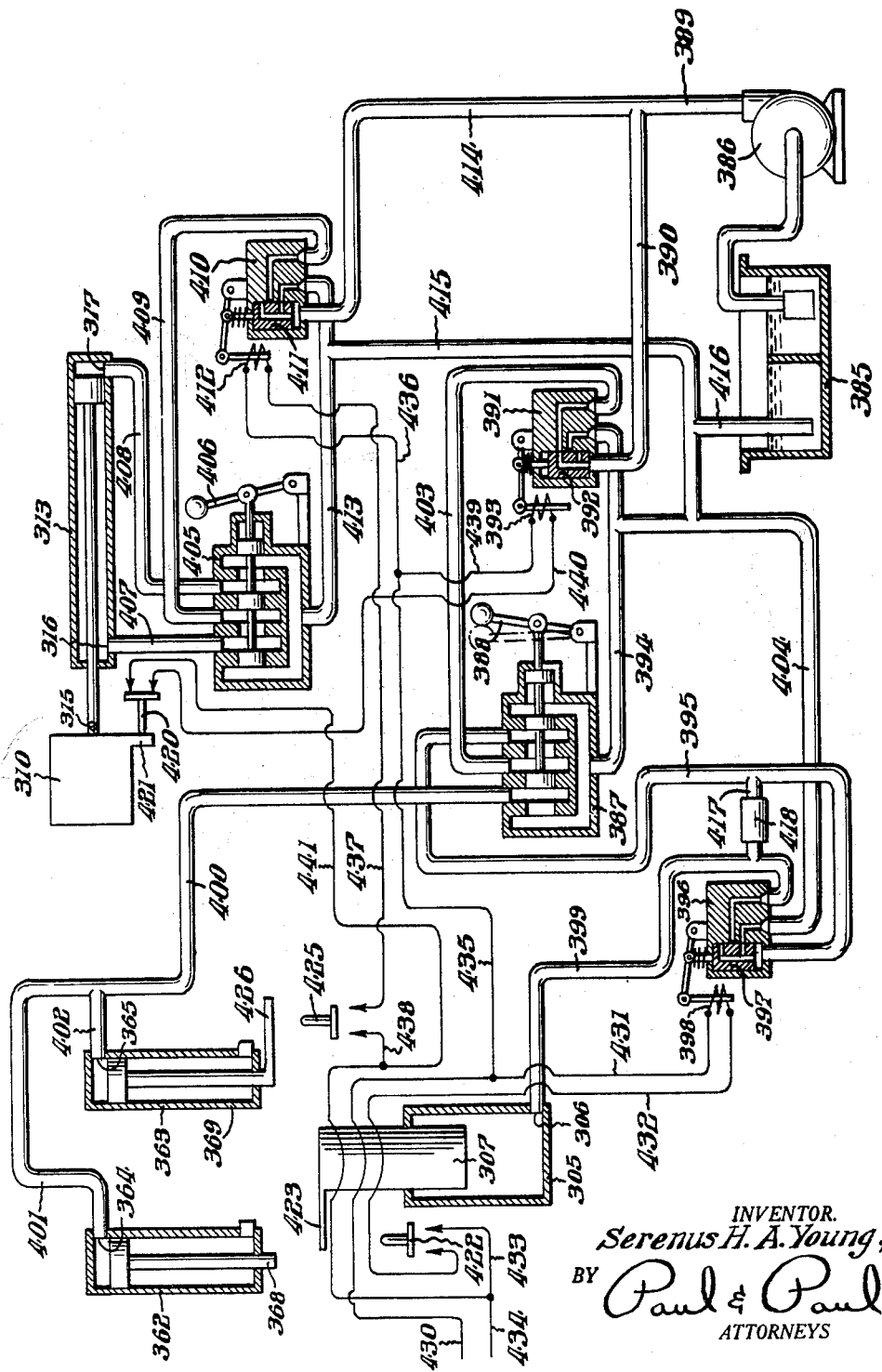

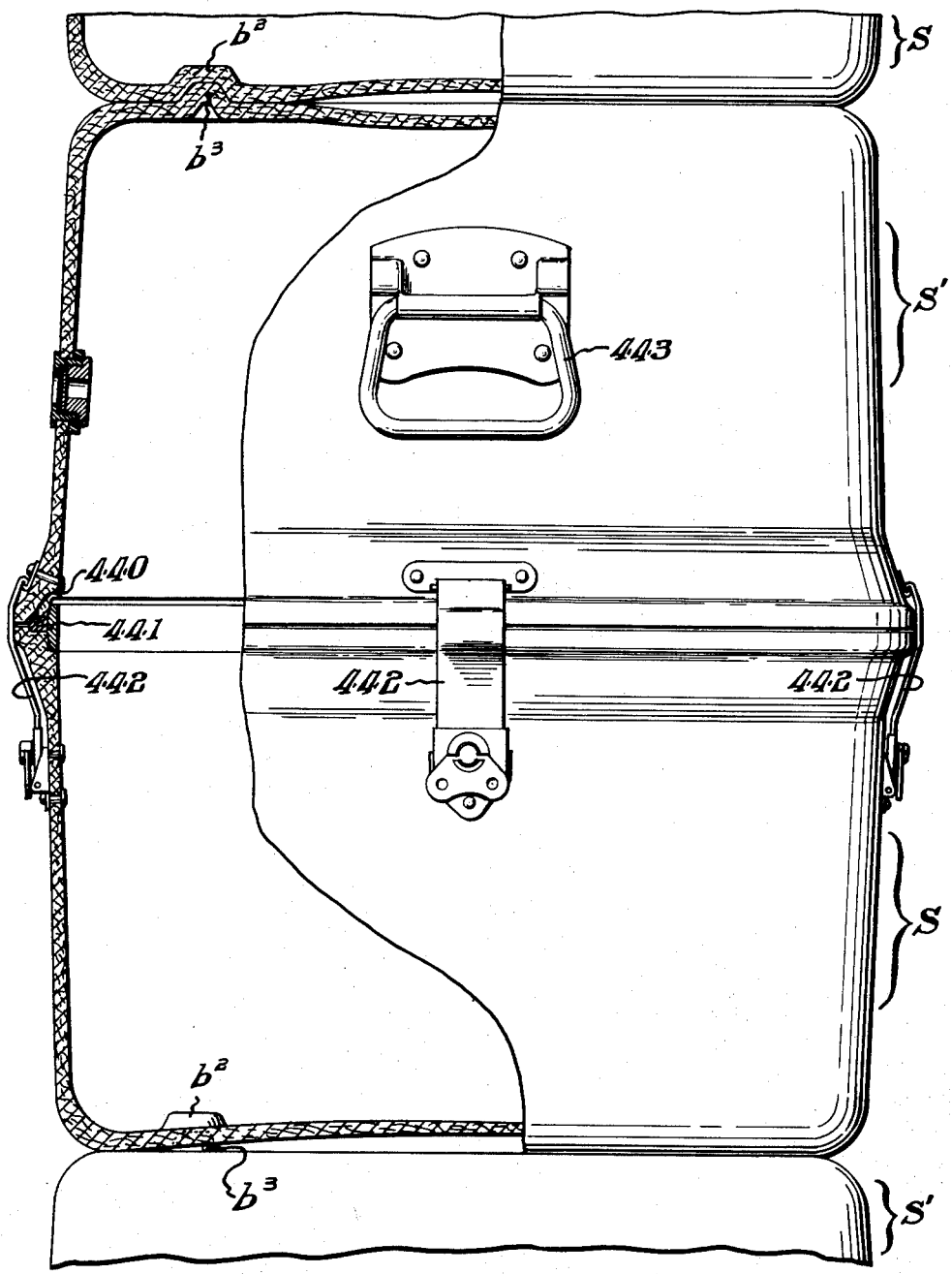

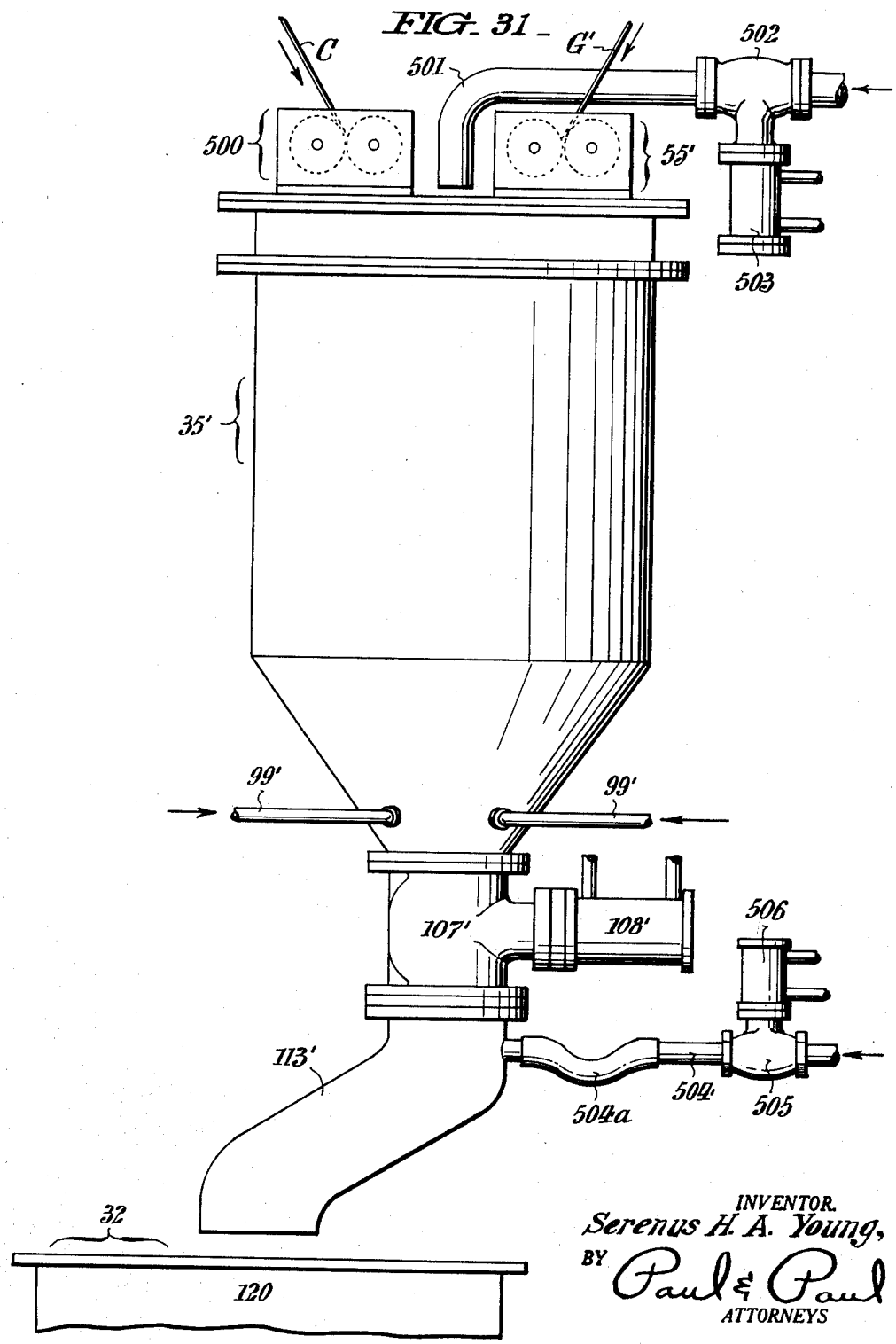

United States Patent Office 3,127,307
Patented Mar. 31, 1964

3,127,307
METHOD OF MOLDING SHAPED ARTICLES FROM FLUID FIBROUS SUSPENSIONS
Serenus H. A. Young, Karthaus, Pa., assignor, by direct and mesne assignments, of seventy-nine and three-tenths percent to J. J. Griffin, substitute trustee of the trust for the benefit of various assignees, as tenants in common, and twenty and seven-tenths percent to Pressurform Container Corporation, a corporation of Oklahoma
Original application Oct. 1, 1956, Ser. No. 613,139, now Patent No. 2,969,835, dated Jan. 31, 1961. Divided and this application Nov. 8, 1960, Ser. No. 67,971
5 Claims. (Cl. 162—145)

This application is a division of my co-pending patent application, Serial Number 613,139, filed October 1, 1956, entitled Molding Shaped Articles From Fluid Fibrous Suspensions, now Patent No. 2,969,835.

This invention relates to the molding of shaped articles from fluid fibrous suspensions.

For many years products of various types and configurations have been molded from fluid fibrous suspensions, such as vegetative pulps. However, such products have generally been of a relatively simple construction with substantially uniform sections throughout. While attempts have been made to mold or "felt" articles having non-uniform sections, such attempts have not been successful due to the inability of known molding equipment and processes to produce non-uniform sections with uniform density and composition.

Numerous fibrous formulations have been used in molding such products, but in nearly all cases organic fibers, such as cotton, wood, jute, paper, rag and the like, have been used. The stock from which such organic fibers are obtained is generally available in sheets or "laps." In preparing the suspensions or pulps, the laps are added to a quantity of the fluid carrier which is then severely agitated to break up the laps and disperse the resulting fibers throughout the fluid. While useful for many purposes, products made from organic formulations have limited physical properties, thus limiting their use. In recent years, in an endeavor to improve the physical properties of such molded articles, attempts have been made to intersperse within the organic suspensions inorganic fibers, such as glass and asbestos.

In the case of glass, which has been the most widely used inorganic material, the fibers are prepared from fiber glass strands or rovings composed of upwards of 200 individual glass filaments, each of which has a diameter of from .00035 to .0004 inch. Fiber glass in the form of strands or rovings is generally available for commercial use in packages or spools.

In preparing fiber glass for fibrous suspensions, I have found it desirable to chop the rovings into staple lengths or bundles of not less than .250 inch, nor in excess of .750 inch. If the length of the fiber glass staple is less than .250 inch, a loss of physical properties will result in the finished products, and if the length thereof is longer than .750 inch, the pulp will become stringy and difficult to handle in the molding apparatus.

It is highly important, if maximum physical properties are to be maintained, that the integrity of the glass fiber staple or bundles be maintained. If the integrity of the glass fiber bundles is broken down, thereby permitting dispersion of the individual glass filaments, a significant loss in the physical properties of the finished products will result.

I have found, through experimentation and practice, that articles molded from fluid fibrous suspensions wherein the fiber content is composed of 80% glass fibers and 20% organic fibers will have optimum physical properties. If a lesser proportion of glass fibers is used, the ability of the finished products to withstand hard usage will be diminished. Of course, for many molded fiber glass products maximum physical strength is not required, and thus manufacturing costs may be reduced by increasing the proportion of organic fibers.

Essential to the successful use of inorganic staple in molding shaped articles is its uniform dispersion throughout the suspension. In the case of fiber glass, there is a tendency for the staple to settle out of the suspension. Attempts have been made to achieve and maintain uniform dispersion of the fiber glass staple throughout the suspension by mixing the staple into the fluid carrier at the same time that the organic fibers are interspersed therein, and then subjecting the resulting slurry to constant or repeated agitation. However, due to the severe agitation required to disperse the organic fibers throughout the fluid carrier, the integrity of the fiber glass bundles is broken down with the result that the individual glass filaments are dispersed.

To overcome this difficulty, I have developed a new approach to the problem of combining fiber glass staple with organic fiber in a fluid suspension. By experimentation and practice, I have found that very little agitation of the suspension is required to secure an excellent dispersion of the glass fiber bundles. Accordingly, in the preferred practice of my invention, I prepare the glass-organic suspension by first dispersing the organic fibers throughout the fluid by any well known means, and thereafter adding the fiber glass staple. By mildly agitating the slurry charge resulting from the mixture of the staple with the organic suspensions, as by bubbling compressed air therethrough, I have found that excellent dispersion of the staple is obtainable within two minutes or less. In this manner, violent agitation of the staple is avoided and the integrity of the glass fiber bundles is completely maintained.

I have also found that it is possible to dispense with the pulping operation entirely by simultaneously mixing prepared organic and inorganic fibers with a fluid carrier while the carrier is being mildly agitated, and then diluting the slurry thus formed for molding.

Preferably, the molding operation should be performed immediately following the dispersion of the glass staple throughout the slurry. In this manner, storage of the slurry is eliminated with resultant elimination of the necessity to re-agitate the slurry supply each time quantities are drawn therefrom for use. Such re-agitation would be required due to the tendency of the glass staple to settle in the suspension, and repeated re-agitations would impair the integrity of the glass fiber bundles.

In the practice of my invention, I mold from the slurry "preforms" having substantially the shape and configuration of the desired finished part or product. Such preforms are dried and then placed in a finishing press where they are heated, molded and impregnated with a thermosetting resin to produce the finished product.

By the processes thus described, it is possible not only to mass produce from fiber glass suspensions molded articles having optimum physical properties, but it is also possible to produce them with non-uniform sections which are uniform in density and composition throughout.

Accordingly, my invention has for its chief aim to make possible, through provision of novel methods and apparatus for carrying out my novel methods, improvements in the production of shaped articles which are first molded from fluid fibrous suspensions, wherein inorganic fibers are interspersed with organic fibers, and thereafter impregnated with thermosetting resinous binding material in such manner as to render the finished product smooth and hard surfaced, and tough against easy fracture or deformation.

A further object of my invention is to make possible the molding of shaped articles from fluid fibrous suspensions wherein such articles may have non-uniform sections of uniform density and composition.

A further object of my invention is to make possible the molding of shaped articles from fluid fibrous suspensions wherein such articles may be reinforced where necessary or desired.

A further object of my invention is to make possible the molding of shaped articles from fluid fibrous suspensions containing inorganic fibers, such as fiber glass staple, wherein such articles may have optimum physical properties.

A further object of my invention is to make possible the preparation of fluid-glass fiber suspensions in which uniform dispersion of the fiber glass bundles may be achieved without impairing the integrity thereof.

A further object of my invention is to provide a method of molding shaped articles from fluid fibrous suspensions containing inorganic staple, such as glass, wherein the slurry is prepared immediately prior to the first molding operation.

A further object of my invention is to provide a method of molding shaped articles from fluid fibrous suspensions containing inorganic staple, such as glass, wherein a slurry is prepared by rapidly mixing and dispersing the inorganic staple throughout a fluid containing organic fibers, then immediately compressing the slurry to mold a preform therefrom, drying the preform and then heating, molding and impregnating the preform with a thermosetting resin to produce a finished article.

Briefly described, the preferred apparatus for carrying out the methods of my invention includes a metering vessel with means for controlled admission thereto of a predetermined quantity of a fluid containing fibers of organic material, means for concurrently drawing inorganic rovings, such as fiber glass, from supply sources and severing them into staple lengths to drop into the fluid as it is being introduced into the vessel and means operative all the while for agitating the slurry thus formed in the vessel to disperse and maintain the inorganic staple uniformly throughout the slurry. The apparatus also comprises a press into which measured charges of the slurry are introduced, said press having opposing die elements by which the slurry is compressed and the fluid is discharged therefrom to thereby produce preforms, and means for dislodging the preforms from the die elements and removing them from the press for drying. The apparatus further includes a finishing press into which the preforms are placed and a charge of thermosetting resinous material is introduced, said finishing press having opposing die elements, one or both of which may be heated, by means of which the resinous material and preforms are compressed, impregnating the preforms with the resin while at the same time heat-setting the resin to thereby convert the preforms into a finished article, and means for dislodging the finished product thus formed from the dies for ready removal from the press.

Other objects and advantages of my invention will appear from the following description of the attached drawings showing preferred embodiments thereof, wherein:

FIGS. 1 and 2, taken together, show, in side elevation, more or less diagrammatically, preferred apparatus for producing shaped articles from fluid fibrous suspensions in accordance with the method of my invention.

FIG. 3 is a view partly in end elevation and partly in transverse section taken as indicated by the angled arrows III—III in FIG. 1, showing the preform press.

FIG. 4 is a horizontal section of the preform press, taken as indicated by the angled arrows IV—IV in FIG. 3.

FIG. 5 is an elevational view of the finishing press looking as indicated by the angled arrows V—V in FIG. 2.

FIG. 6 is a larger scale view, partly in side elevation and partly in section, looking as indicated by the angled arrows VI—VI in FIG. 1 of the metering means for the preform press.

FIG. 7 is a fragmentary detail view in elevation looking as indicated by the arrows VII—VII in FIG. 6.

FIG. 8 is a diagrammatic view showing how the metering means of FIG. 6 is controlled.

FIG. 9 is a fragmentary view in vertical section of the preform press drawn to a larger scale with the die elements arranged for the production of one type of preform.

FIG. 10 is a fragmentary sectional view of the preform press taken as indicated by the angled arrows X—X in FIG. 9.

FIGS. 11, 12, 13 and 14 are diagrammatic views similar to FIG. 9 showing successive stages in the production of a preform in the preform press.

FIG. 15 is a view corresponding to FIG. 10 showing the preform press arranged for the production of another type of preform.

FIG. 16 is a fragmentary view corresponding to FIG. 15 showing the preform press arranged for the production of yet another type of preform.

FIG. 17 shows in perspective, with portions broken away, a hollow half section of a container in which the side walls and bottom are made from separate preforms, and also shows a separate side wall and bottom preform for another such container section.

FIG. 18 is a diagrammatic view showing, in normal or starting condition, the facilities provided for controlling the operation of the preform press.

FIGS. 19 and 20 are views similar to FIG. 18 showing successive stages in the control of the preform press.

FIG. 21 is a large scale fragmentary view, in vertical section, of the finishing mold press.

FIG. 22 is a fragmentary detail in sectional view taken as indicated by the angled arrows XXII—XXII in FIG. 21.

FIG. 23 is a horizontal section, partly broken away, of the finishing mold press taken as indicated by the angled arrows XXIII—XXIII in FIG. 21.

FIG. 24 is a fragmentary view in section taken as indicated by the angled arrows XXIV—XXIV in FIG. 23.

FIG. 25 is a vertical section of the mold or female die element of the finishing press with side wall and bottom preforms for a container half section assembled therein and with a charge of resin therein in readiness for the final pressing.

FIG. 26 is a horizontal section taken as indicated by the angled arrows XXVI—XXVI in FIG. 25.

FIG. 27 is a fragmentary view similar to FIG. 24 showing the female and male die elements of the finishing mold press arranged for the production of container half sections with bottom preforms of a modified type.

FIG. 28 is a diagrammatic view, showing in normal or starting condition, the facilities provided for controlling the operation of the finishing mold press.

FIG. 29 is a view similar to FIG. 28 showing an intermediate stage in the control of the finishing mold press.

FIG. 30 shows a container in stacked relationship with other containers made in accordance with my invention.

FIG. 31 is a diagrammatic view in elevation of a modified form of metering means for the preform press.

Definitions

The term "fluid" as used herein includes, but is not necessarily limited to, water, air or other gases, liquid resins and resin solutions, and all equivalents thereof.

The term "organic fibers" as used herein includes, but is not necessarily limited to, fibers of paper, cocoa, jute, manila, wood, cotton, rag and other textile products and by-products, and all equivalents thereof.

The term "inorganic fibers" as used herein includes, but is not necessarily limited to, fibers of glass and asbestos, and all equivalents thereof.

The terms "resin," "resinous material" and "resinous binding material" are used interchangeably herein and include, but are not necessarily limited to, thermosetting resins, such as epoxide, polyester and phenolic resins, and all equivalents thereof.

*Slurry Preparation*

In the embodiment of my invention shown in FIG. 1 of the drawings, the numeral 1 designates a pulper, preferably lined with rubber, supported atop a storage reservoir 2, also preferably lined with rubber. A fluid, which for the purposes of illustration may be water, is delivered into the pulper 1 through a branch pipe 3 from a water main 4 under control of a valve 5, and organic fiber in lap form is introduced in a predetermined quantity ratio into the water in the pulper through a suitable means 6. Where cotton fibers are used, highly satisfactory dispersion will result with a fiber/water ratio of 2% by weight. As shown, the water main 4 is provided with a shutoff valve 7. A motordriven rotary agitator 8, or other well known means, constantly stirs the contents of the pulper 1 to uniformly distribute the fibers throughout the water to form a fibrous suspension or pulp. From time to time pulp is discharged from the pulper 1 into a reservoir 2, which is partially filled with water, by opening the drain valve 9 which is operable through a link rod 10 by means of a lever 11. Water is supplied directly to the reservoir 2 from a second branch pipe 12 connected to the supply main 4 upon opening a valve 13, which is operable by a magnetic actuator 15 interposed, with a control switch 16, in an electric circuit 17, 18. In the embodiment of my invention specifically shown, it is preferred to dilute the pulp by mixing it with a predetermined quantity of water before adding the inorganic staple. Where cotton fibers are used, it is desirable to reduce the fiber/water ratio in the reservoir to approximately .5% by weight.

As shown, the switch 16 in circuit 17, 18 is arranged to be opened automatically (thus closing valve 13) by a cam projection 19 at the top end of a rod 20 which, at its lower end, is connected to a float ball lever 21 within the reservoir. By coordination with a scale 22 at one side of the tank 1, a pointer 23 on the rod 20 indicates the level of the pulp in the reservoir 2. The pulp in the reservoir 2 is maintained in a constant state of turbulence by compressed air discharged upwardly therethrough from a submerged jet manifold 25 connected to a pipe 26 leading from a compressed air supply source (not illustrated), the air flow being regulatable by means of a valve 27 in said pipe. At the bottom, the reservoir 2 is provided with an outlet valve 28 which is operable, through a linkage 29, 30, by means of a lever 31 adjacent the lever 11.

Comprehensively designated 32 in FIG. 1 is the preform mold press at one side of which is mounted a batch metering vessel 35 having an outlet valve 107. As shown, a conduit 36 extends from the outlet valve 28 of the reservoir 2 to the top of the metering vessel 35. A valve 39 in the conduit 36 is arranged to be operated to admit controlled quantities of pulp from the reservoir 2 into the vessel 35. The valve 39 is opened and closed by a double acting cylinder 40 having ports at the opposite ends thereof in communication, through pipes 41 and 42, with a control valve 43 in a pipe 45 through which air under pressure is conducted to actuate the cylinder 40. The valve 43 has a magnetic actuator 46 connected, together with the switches 47 and 48, in a circuit 49, 50.

A by-pass conduit 51 intersects conduit 36 ahead of the valve 39 and connects into the top of pulp storage reservoir 2. Interposed in the conduit 36 is a pump 37 driven by a motor 38 to continuously conduct pulp from the reservoir 2 through the conduit 36 either into the vessel 35, when the valve 39 is open, or to by-pass 51 and back to the reservoir 2, when the valve 39 is closed.

As shown in FIG. 6, vessel 35 is provided with a lateral off-set 35a in which is disposed a float 115 having a vertical rod 116 extending upwardly through the top of said off-set. At the upper end of rod 116 is a finger projection 117 for actuating the switch 47 in the circuit 49, 50. The quantity of pulp discharged into the vessel 35 from the reservoir 2 is controlled as follows. By actuating means more fully described hereinafter, valve 107 is closed and valve 39 is opened to admit pulp from the reservoir 2 into the vessel 35. As the pulp level in the vessel 35 rises the float 115 also rises, as shown in FIG. 6. When the pulp in vessel 35 has reached the desired quantity, the finger projection 117 is disengaged from switch 47 to break the circuit 49, 50 with resultant de-energization of magnetic actuator 46. Upon de-energization of the actuator 46, the valve 39 is automatically closed, by means of the cylinder 40, to cut off pulp flow to the vessel 35.

Mounted atop the vessel 35 is a cutting device 55 which, as shown in FIGS. 1, 6 and 7, includes a pair of cooperative rolls 56, 57. Roll 56 is provided with uniformly spaced, circumferentially arranged cutting blades and is secured to a shaft 58. Freely mounted on the shaft 58 is a pulley 59 which, through a belt 60, is arranged to be driven from a smaller pulley 61 on the shaft of an electric motor 62. Splined on the shaft 58 and adapted to engage pulley 59 is a clutch 63 which, through the linkage 64, is connected to an armature 65 common to a pair of solenoids 66 and 67.

From multiple supply packages P, which may be supported on a platform 70 (see FIG. 1) above a control cabinet 71, individual fiber glass rovings or strands G are directed through separate guide tubes 72 into the nip of the rolls 56, 57 of the cutting device 55 and severed into short staple or fibers, preferably of from .250 to .750 inch in length, the fibers so cut dropping into the pulp as it is introduced into the vessel 35 from the conduit 36 to thereby be enveloped and intermixed therewith.

The quantity of fiber glass staple added to the pulp in vessel 35 is controlled by the setting of the counter 73, which in turn controls the number of revolutions of the rolls 56, 57 of the cutting device 55. Counter 73 is driven through a flexible shaft 74 from the shaft 58.

As shown in FIG. 8, electric current for the operation of the motor 62 is supplied from power lines 75, 76 having a switch 77 interposed therein. Energization of the solenoids 66 and 67 is controlled by a relay 78 of which the actuating coil 78a is in a circuit 79, 93a, 93, 81, 82 having a switch 83 therein, said circuit being connected across power lines 75, 76. The switch 83 is arranged to be actuated by the adjustable cam 84 of the counter 73. The solenoid 66 is in a circuit 86, 87, 88, 82 which is connected across power lines 75, 76, and is arranged to be opened and closed by the contact 90 of the relay 78. When the armature 78b and the contact 90 are in the full line position shown in FIG. 8, electric current flows through the circuit 86, 87, 88, 82 and contact 90 to energize the solenoid 66 and constrain the armature 65 to the retracted position shown in FIG. 8 to thereby disengage the clutch 63.

Another circuit 82, 81, 80, 80a, 94 contains the switch 92 and the normally dormant re-set motor 95 for the counter 73. Switch 92 is arranged to be operated by the projection 145 on the reciprocating upper die element 119 of the press 32.

During operation of the cutting device 55, shaft 84a and cam 84 are driven by the flexible shaft 74 through a pair of speed reduction gears 91, the larger gear being connected to the shaft 84a through a slip clutch 91a. As shown in FIG. 8, the shaft 84a is also coordinated with the re-set motor 95 through gearing 95a. When the motor 95 is operated to re-set the counter 55, as presently explained, it restores the cam 84 to its starting position by driving the shaft 84a through the gearing 95a. When shaft 84a is thus driven, the larger gear of the reduction pair 91 "slips" on said shaft as a result of the yielding action of the slip clutch 91a, to prevent rotation of the cutting device 55 by the motor 95.

The solenoid 67 is interposed in a circuit 86, 96, 97, 82 which is connected across power lines 75, 76 and arranged to be closed by the contact 98 of the relay 78. When the armature 78b and the contact 98 are in the full line position shown in FIG. 8, the circuit 86, 96, 97, 82 is open and solenoid 67 is de-energized.

The operation of the controls for the cutting device 55 is as follows. The adjustable cam 84 is positioned on the shaft 84a to predetermine or "set" the number of revolutions to be made by the cutting rolls 56, 57. Upon descent of the die element 119, the projection 145 actuates the switch 92 to close the circuit to the re-set motor 95, causing said motor to move the adjustable cam 84 to its zero or starting position. When cam 84 reaches its starting position, the switch 83 is permitted to close, whereby the coil 78a of the relay 78 is energized, causing the armature 78b to move so that the contacts 90, 98 assume the dotted line position of FIG. 8. Contact 98 thus closes the circuit to solenoid 67 whereupon said solenoid activates the clutch 63, thereby permitting the cutting rolls 56, 57 to be driven by motor 62. When the cutting rolls 56, 57 have completed the number of revolutions for which the cam 84 has been set, said cam will open switch 83, thereby de-energizing the coil 78a of relay 78, whereupon the armature 78b and the contacts 90, 98 assume their full line position of FIG. 8, thereby energizing solenoid 66 and de-energizing solenoid 67 to retract the clutch and stop rotation of the cutting rolls 56, 57.

The slurry charge prepared in the vessel 35 from the mixture of pulp and fiber glass staple is kept in a continuing state of agitation to prevent settling of the staple and to keep it evenly distributed throughout the slurry. A preferred manner of thus agitating the slurry is to pass compressed air upwardly therethrough from jet tubes 99 connecting into the tapered bottom portion of the vessel 35 from a supply pipe 100. Interposed in the pipe 100 is a regulating valve 101 and a control valve 102 having a magnetic actuator 103 connected in an electric circuit 104, 105 with a switch 106. By bubbling compressed air up through the slurry in the manner described, it is possible to achieve complete and uniform glass dispersion throughout the slurry within a period of two minutes or less.

An outlet valve 107 at the bottom of the vessel 35 is opened and closed by a double acting cylinder 108 having ports at opposite ends thereof connected by tubes 109 and 110 to a control valve 111 in a pipe line 112 (see FIG. 1). When the valve 107 is opened, the slurry is discharged from vessel 35 through a swivel spout 113. During discharge, the slurry is continually agitated by compressed air introduced into the valve 107 through the jet tube 114 connected to air supply pipe 100.

The Preform Mold Press

From FIGS. 1, 3 and 9 to 14 inclusive, it will be seen that the preform mold press 32 includes complementary lower and upper die elements 118 and 119 adapted to compress a charge of slurry from the metering vessel 35 to produce a preform A. Both die elements are preferably made of brass in order to resist water corrosion, and have their opposing faces complementally shaped to produce a preform of the desired configuration. As shown, the lower die element 118 is mounted and constrained to reciprocal movement in a felting cylinder or mold 120 mounted in the lower portion of the press 32. The felting cylinder 120 has a plan configuration conforming to that of the upward moving die element 118 and the felting cylinder 120 and die element 118 are closely fitted, preferably having side clearances of the order of from .003 to .006 inch. As shown in FIG. 9, a seal 124 may be utilized to prevent leakage between the cylinder 120 and die element 118. The felting cylinder 120 must be designed to withstand, without distortion, severe internal fluid pressures and preferably is made of stainless steel plated metal for corrosion resistance and to provide dissimilar metals contact with the die element 118.

While, as shown in the drawings, the lower die element 118 is mounted to reciprocate in cylinder 120, it is within the scope of this invention to reverse the arrangement and have upper die element 119 mounted and constrained to reciprocal movement in said cylinder.

Lower die element 118 is connected to the piston rod 121 of an underlying, vertical axis, double acting pressure fluid cylinder 122. Under die element 119 is connected to the piston rod 123 of an overlying, vertical axis, double acting pressure fluid cylinder 125 supported in the upper part of the press 32. Actuating pressure fluid is introduced into and exhausted from the upper and lower ends of the cylinders 122, 125 through pipes 126, 127, 128, 129 respectively. Preferably, the cylinder 125 should exert a greater pressure on the upper die element 119 than that exerted on the lower die element 118 by the cylinder 122, and to achieve this result cylinder 125 should either have a somewhat larger diameter or be subjected to somewhat greater fluid pressure.

With the press 32 open, as shown in FIGS. 1 and 3, the lower die element 118 occupies a position well down in the cylinder 120, and the upper die element 119 occupies a position well above said cylinder. In each molding operation, the measured charge of slurry in the vessel 35 is released into cylinder 120 through valve 107 and spout 113, said spout having its distal end positioned between the die elements 118 and 119, as shown in FIG. 1. Thereupon, the upper die element 119 is lowered to partially enter and to seal fluid tightly the upper end of cylinder 120. As the upper die element 119 descends, a cam roller 519 affixed thereto strikes spout 113 causing it to swivel about its vertical axis to a position adjacent the press 32 and completely outside the path of travel of said die element 119. The lower die element is then raised to the upper end of cylinder 120, terminating its movement so as to provide a space between the opposing faces of the two die elements 118 and 119 equal to the desired thickness of the preform A to be produced from the slurry, as shown in FIGS. 9, 10 and 13. The seal between the upper die element 119 and the upper end of cylinder 120 is effected by encounter of the peripheral flange 130 of said die element 119 with perimetric flange 131 at the top of the cylinder 120, the interposed gasket 132 serving to render the juncture fluid tight. Since the pressure exerted on die element 119 is greater than that exerted on die element 118, leakage of slurry fluid around gasket 132 will be prevented. After the die elements 118 and 119 are retracted, a spring 113a urges spout 113 back into position between said die elements for delivery of another slurry charge to the press.

The die elements 118 and 119 are formed with hollows 118a and 119a, respectively, and the opposing faces of said elements 118 and 119 are formed with multiple apertures or perforations 135 and 136, respectively, which are in communication with said hollows. Additionally, the faces of the die elements 118 and 119 are covered, respectively, with linings 137 and 138 of either finely perforated sheet metal or woven screen, both preferably made of brass, to prevent the fibers in the slurry from entering and clogging the apertures 135, 136.

Connected to the hollow of the lower die element 118 are flexible hoses 139 and 140 and connected to the hollow of the upper die element 119 are flexible hoses 141 and 142. When the upper die element 119 has been advanced to seal off the upper end of cylinder 120, as shown in FIGS. 11 and 12, air and water in said cylinder are evacuated through apertures 136, hollow 119a and hose 141 by any well known suction or vacuum means impressed upon said hose. The suction of hose 141 continues to be exerted upon hollow 119a and apertures 136 during retraction of the die element 119, for a purpose presently to be explained.

During the initial advancement of the lower die element 118, as shown in FIG. 11, compressed air is introduced from hose 140 into the hollow 118a and passes upwardly through the apertures 135 to agitate the slurry and maintain the fiber glass staple uniformly dispersed therethrough. As the molding operation proceeds, as shown in FIG. 12, flow of air from the hose 140 is cut off whereupon the air and water in the cylinder 120 are also evacuated by passage through apertures 135, hollow 118a and hose 139 by any well known suction or vacuum means impressed upon said hose. When the die elements 118 and 119 have completed their advance movement, as shown in FIG. 13, the suction in the hose 139 is closed off and compressed air once again is passed through the hose 140 to unseat the preform A from the die element 118. Since the preform A is thus dislodged from the die element 118a, it will cling to the face of the upper die element 119, as said element is retracted, as a result of the suction from hose 141. As shown in FIG. 14, after the die elements 118 and 119 have been fully retracted, the suction in hose 141 is closed off and compressed air passed through hose 142 to doff the preform.

Mounted on the upper die element 119, as shown in FIG. 1, are upstanding fingers 143 and 144 for actuating the valve 111 and the switch 48, respectively, and, as shown in FIG. 8, there is also mounted thereon a lateral projection 145, previously described, for actuating the switch 92. In addition, as shown in FIG. 3, a switch 146 is mounted on the frame of the press 32 at the rear thereof.

For removing sucessively produced preforms from the press, I have provided a retractable transfer grid 147, shown in FIGS. 1, 3 and 4, which is moved into position beneath the upper die element 119 when the press is opened following the molding of a preform. At the time when the grid 147 is properly positioned below mold element 119, the suction in hose 141 is closed off and the preform doffed by the compressed air passing through hose 142. The grid, with the preform thereon, is then retracted.

The grid 147 has lateral brackets 148 constrained to sliding movement on parallel horizontal guide rods 149 supported rearwardly by a framework 150 and forwardly by the base of the mold press 32. The grid 147 is connected to a piston rod 151 of a double acting pressure fluid cylinder 152 with ports 153 and 154 at opposite ends through which pressure fluid is introduced into and exhausted from said cylinder. Upon retraction of the transfer grid 147, the preforms are removed from the grid 147 and placed in a drier (not illustrated) and, after drying, are stacked in readiness for finishing in the finishing press.

As shown in FIG. 3, a switch 155, mounted on the frame of the press 32 at the rear thereof, and a switch 157, on the frame 150, are intermittently actuated by an upstanding projection 158 on the grid 147 as said grid terminates its forward and return strokes, respectively.

For the purpose of illustration only, I have shown in the drawings an embodiment of apparatus for carrying out the methods of my invention adapted to the production of containers. As shown in FIG. 9, the faces of the die elements 118 and 119 are complementally shaped to produce, at each molding operation, a preform A suitable for a side wall of a hollow container half section such as that shown at S and S' in FIG. 30. As shown in FIGS. 9 and 17, the preform A is formed with its side and bottom edges rounded and tapered in thickness, as at $a$, and $a'$, and has its top edge thickened through a gradual taper as at $a^2$ and stepped as at $a^3$. For the production of preforms such as the one designated B in FIG. 17, suitable for the bottoms of the container half sections, I have provided a second set of upper and lower die elements 160 and 161, as shown in FIG. 15, of which the opposing faces are shaped to mold the preform with a peripheral margin $b$, which is upwardly rounded and tapered in thickness as at $b'$, and with upstanding spot projections $b^2$ in the corner regions. In the modification of FIG. 16, there are shown die elements 160' and 161' which are duplicates of the die elements 160, 161 except for being shaped to produce preforms B' having pendant spot projections $b^3$ in the corner regions. The preforms A, B and B' may be produced in a single preform press 32 by interchange of the above described die elements therein, or may be produced by a plurality of presses 32 of which certain presses would produce one type of preform only. As indicated above, the preforms are dried following their removal from the preform press or presses.

*Controls for the Preform Press*

Oil is used as the pressure fluid to operate the preform press 32 and the transverse grid 147, and is contained in a reservoir 165 at the top of said press (see FIG. 1). The oil is circulated under pressure by a motor driven pump 166 mounted upon the top of reservoir 165. Admission and exhaust of the pressure fluid to and from the lower cylinder 122 of the press 32 is controlled by a valve 167, shown in FIGS. 18, 19 and 20, which is operable by a lever 168. By means of a pipe line 169, 170, 171, 172, the reservoir 165 is connected to the upper port 126 of the cylinder 122 with interposition of the valve 167 and an auxiliary valve 173 having a channelled plunger 174 adapted to be actuated by a solenoid 175. Extending from the lower port 127 of the cylinder 122 to the valve 167 is a pipe 176, and extending from said valve 167 is a pipe 177 which connects to a pipe 178 that discharges into the reservoir 165. A branch pipe 179 extends from the pipe 178 to the auxiliary valve 173.

Admission and exhaust of pressure fluid to and from the upper cylinder 125 of the press 32 is controlled by a separate valve 180 operable by means of a lever 181. A pipe line 170, 182 connects auxiliary valve 173 to a second auxiliary valve 183, the latter valve being similar to valve 173 and having a channelled plunger 185 adapted to be actuated by a solenoid 186. Through pipe 187, the valve 183 is in communication with the valve 180, which in turn is connected to the port 128 of the upper cylinder 125 of the press 32 by way of a pipe 188. The port 129 of the upper cylinder 125 is connected with the valve 180 by means of pipe 189. Leading from the valve 180 to a point of connection with the pipe 178 is a pipe 190 having a short branch 191 in communication with the auxiliary valve 183.

Admission and exhaust of pressure fluid to and from the actuating cylinder 152 for the transfer grid 147 is controlled by another valve 195 similar to the valves 167 and 180 and adapted to be operated by a lever 196. The valve 195 is connected by pipes 197 and 198 with the ports 153 and 154, respectively, of the cylinder 152, and also is connected by a pipe 199 with an auxiliary valve 200 of which the channelled plunger 201 is adapted to be actuated by a solenoid 202. As further shown, a branch pipe 203 extends from the valve 195 and connects with the pipe 178, and a branch pipe 204 extends from the auxiliary valve 200 to a point of connection with the pipe 199.

Included in the controls shown in FIGS. 18, 19 and 20 are normally open switches 205 and 206, which are arranged to be closed when the levers 168 and 181 are moved to operate the valves 167 and 180, three time delay relays 207, 208, 209 and a normally open manual switch 210, all of which, together with valves 167, 180, 195 may be conveniently located in the control cabinet or desk designated 71 in FIG. 1.

As shown in FIG. 18, the suction and air hoses 139 and 140 leading to the lower die element 118 of the press 32 are connected to pipes 211 and 212 extending, respectively, from sources of suction and compressed air (not illustrated). To the pipes 211 and 212 are also connected the suction and air hoses 141 and 142 leading to the upper die element 119 of said press. Interposed in the hoses 139 and 140 are normally closed valves 213 and 214 arranged to be actuated, respectively, by solenoids 215 and 216. Similarly, normally closed valves 217 and 218 are interposed in the hoses 141 and 142 and are arranged to be actuated by solenoids 219 and 220, respectively. See also FIGS. 11 to 14.

The current for actuating the various electrical instrumentalities shown in FIGS. 18, 19 and 20 is supplied from a power line 221, 222. With the system in the normal setting of FIG. 18, current flows from the line 221 through a circuit 223, 224, 225, 226, 227 containing the closed switch 146 to line 222, said circuit energizing the solenoid 202 of valve 200 to position its plunger 201 as shown. At the same time, current flows from line 221 through conductors 223, 228, 229, closed switch 157 and conductors 230, 227 to the line 222 to energize the solenoid 186 of valve 183, thereby positioning its plunger 185 as shown in FIG. 18.

*Preform Press Operation*

With the press 32 open as in FIG. 1, and its various control instrumentalities positioned as in FIG. 18, the pressure fluid is idly circulated through its control system by the pump 166. After a charge of slurry prepared in the metering vessel 35 is released through the spout 113 into the cylinder 120, the switch 210 is closed with consequent energization of the solenoid 175 and shifting of the plunger 174 of the auxiliary valve 173 from the position of FIG. 18 to the position of FIG. 19. The valve 180 is next operated, by shifting its lever 181 (and hence its slide) to the full line position shown in FIG. 19, whereupon pressure fluid is forced by the pump 166 through pipe 169, the channel in the slide 174 of valve 173, pipes 170 and 182, the channel in the plunger 185 of valve 183, pipe 187, valve 180 and pipe 188 (as shown in FIG. 19) into the upper part of cylinder 125 through port 128 to thereby lower the upper die element 119 of the press 32. At the same time, the fluid previously trapped in the lower part of cylinder 125 passes through pipe 189, valve 180, pipe 190 and pipe 178 into the reservoir 165.

As the die element 119 starts its descent, the switch 146 is opened by the retraction of projection 145, as shown in FIG. 19, with the result that the circuit containing the solenoid 202 of the valve 200 is broken and the plunger 201 of said valve shifted to the position shown in FIG. 19. Also, as the die element 119 begins its descent, the upstanding projections 143 and 144 (FIG. 1) thereon move away from the valve 111 and the switch 48. The valve 111 is thereby actuated to admit pressure fluid into the cylinder 108 (see FIG. 1) to close the discharge valve 107 of the metering vessel 35 while the switch 48 is actuated to close the circuit 49, 50 to the solenoid 46 to actuate the valve 43 for admission of pressure fluid to the cylinder 40 and thereby open the valve 39 to allow a fresh charge of pulp to flow into the metering vessel 35. When vessel 35 has been filled with the prescribed quantity of pulp, the float 115 will have risen to a height sufficient to disengage the projection 117 on the float rod 116 from the switch 47, thereby interrupting the circuit 49, 50, whereupon cylinder 40 closes the valve 39 to shut off pulp flow to the vessel 35.

As the die element 119 continues its descent, the projection 145 temporarily closes the switch 92 (see FIG. 8) to establish the circuit containing the re-set motor 95 of the counter 73. The switch 92 is closed for a time interval sufficient for the re-set motor 95 to return the cam 84 of the counter 73 to its zero or starting position, whereupon, as previously described, the cutter means 55 is started to deliver a predetermined quantity of glass staple to the vessel 35.

After the upper die element 119 has been fully lowered, the valve 167 is operated by means of its lever 168 to position its slide as shown in FIG. 20, whereby pressure fluid, forced by the pump 166, passes by way of pipe 169, valve 173, pipes 170, 171, 176 and port 127 into the bottom of the cylinder 122 of the press 32 to raise the lower die element 118 within the felting cylinder 120. At the same time, pressure fluid is exhausted from the upper end of said cylinder 122 through pipe 172, valve 167 and pipes 177 and 178.

With the controls in the starting position shown in FIG. 18, the contacts of the time delay relays 207 and 209 are closed and those of time delay relay 208 are open. When the lever 168 of valve 167 is operated, as shown in FIG. 20, the switch 205 is closed and the circuit 243, 250, 248, 252, 253, 238, 239, 236 established through the coil 216 of the valve 214 to open said valve and permit compressed air to enter the cylinder 120 through the hose 140 and the lower die element 118 to agitate the slurry therein, as shown in FIG. 11. At the same time, when the switch 205 is closed, the circuit 243, 250, 251, 246, 247, 236 is established through the coil of relay 209, whereupon, after a delay of about five seconds, the relay 209 will open to break the aforementioned circuit to coil 216, thus permitting valve 214 to close to shut off further flow of compressed air to the cylinder 120 of press 32.

In addition, when switch 205 is closed, the circuit 243, 254, 255, 241, 242, 235, 236 is established to the coil 219 of the valve 217 to open said valve and thereby place the hollow of the upper die element 119 in communication with the suction source of the hose 141, as shown in FIGS. 11, 12 and 13. By this means, the air and water in the cylinder 120 of press 32 is drawn off through hose 141.

Finally, when switch 205 is closed, the circuit 243, 244, 245, 246, 247, 236 is established through the coil of relay 208 which, after a delay of about five seconds, will close to establish the circuit 243, 250, 248, 249, 247, 236 to the coil 215 of the valve 213, whereupon said valve will open, placing the hollow of lower die element 118 in communication with the suction of hose 139, as shown in FIG. 12.

After the die elements 118 and 119 have reached their fully advanced positions to complete the molding of the preform, as shown in FIGS. 9, 10, 13 and 20, the lever 168 of the valve 167 is returned to the starting position shown in FIG. 18, thereby causing the die element 118 to retract and opening the switch 205 to break the circuits to the coils 215 and 219 of the vacuum valves 213 and 217, whereupon said valves will close. At the same time, the lever 181 of valve 180 is moved back, past its starting position, to the dotted line position of FIG. 18, thereby causing the upper die element 119 of press 32 to retract. When the lever 181 is moved to the dotted line position of FIG. 18, the switch 206 is closed and the circuit 223, 228, 231, 233, 237, 238, 239, 236 established to the coil 216 of valve 214 causing said valve to open to again permit compressed air to pass to the lower die element 118 of press 32, this time for the purpose of unseating the preform from the face of the die element 118. At the same time, when switch 206 is closed, the circuit 223, 228, 231, 233, 234, 235, 236 is established through the coil of relay 207, whereupon, after a delay of about five seconds, the relay 207 will open to break the aforementioned circuit to coil 216, thus permitting valve 214 to close to shut off further flow of compressed air to the lower die element 118.

In addition, when switch 206 is closed, the circuit 223, 228, 231, 232, 240, 241, 242, 235, 236 is established to the coil 219 of the valve 217 to open said valve to again place the upper die element 119 of press 32 in communication with the suction source of hose 141. Thus, the die element 119 will remain in communication with the suction source during its retraction, with the result that the preform will cling to the face thereof when the preform press is opened.

When the upper die element 119 rises, it passes switch 92, but does not actuate it. As the upper die element 119 completes its upward movement, the projection 145 closes switch 146, thereby re-establishing the circuit to the valve 200, the plunger 201 of which then re-assumes the position of FIG. 18.

The lever 196 of valve 195 is next moved to the dotted position of FIG. 18, whereupon pressure fluid is forced by the pump 166 through the pipe 169, the channel in the plunger 174 of the valve 173, pipes 170, 171 to the valve 200, through the channel of the plunger 201, pipe 199 to the valve 195, through the valve 195 and pipe 198 to the port 154 of cylinder 152. The piston of the cylinder 152 will thereby be acted upon to shift the grid 147 forward, and projection 158 on the grid will move away from switch 157 to open the circuit to the coil 186 of valve 183, whereupon the plunger 185 will shift to permit exhaust through the pipes 191, 190 and 178 to the reservoir 165, preventing operation of the valve 180 during advance of the grid 147. Fluid exhaust from cylinder 152 will take place through the port 153, pipe 197, valve 195, pipes 203 and 178 to the reservoir 165.

When the grid 147 reaches its forward position, as shown in FIG. 14, it will actuate the switch 155 to open the circuit to the coil 219 whereupon the vacuum valve 217 will close, cutting off the suction on the upper die element 119. At the same time, the switch 155 will close the circuit 256, 257, 258, 235, 236 to the coil 220 and air valve 218 will open to permit compressed air from hose 142 to dislodge the preform A from the upper die element 119 and permit it to drop onto the grid 147, as shown in dot and dash lines in FIG. 14. After reception of the preform A by the grid 147, the lever 196 of valve 195 is returned to the full line position of FIG. 18, whereupon pressure fluid will flow from pump 166 through pipe 169, the plunger 174 of valve 173, pipes 170, 171, the plunger 201 of valve 200, pipe 199, valve 195, pipe 197 and the port 153 of cylinder 152 to return the grid 147 to its retracted position, while exhaust of cylinder 152 takes place by way of the port 154, pipe 198, valve 195, pipes 203 and 178 to the reservoir 165.

As the grid 147 is retracted, the switch 155 is actuated to open the circuit to coil 220 and close the circuit to coil 219. When the grid 147 has been fully retracted, the projection 158 will close switch 157 to re-establish the circuit to the coil 186 of the valve 183, the plunger 185 of which will then reassume the position of FIG. 18. The lever 181 of valve 180 is then returned to its starting position shown in full lines in FIG. 18 to thereby open the switch 206 and break the circuit to coil 219, causing valve 217 to shut. The apparatus is now ready for the next preform molding operation.

*The Finishing Mold Press*

Referring now to FIGS. 2 and 5, the finishing mold press, which is mounted on a platform 300, has a base 301 and a head 302 sustained at an elevation above the base by four corner columns 303. Within the platform 300 and extending up through the base 301 is a ram cylinder 305 having a port at 306 through which pressure fluid is admitted and exhausted to raise and lower the plunger 307 of the ram. Affixed to the top of the plunger 307 is a carriage 308 which supports horizontal guide rails 309 for the mold 310, said rails extending beyond the press and being supported at their distal ends by screw stops 311 adjustable in the top of a standard 312, as shown in FIG. 5. The mold 310 is shiftable from a central position in the press to and from the broken line position in FIG. 5 on the extended portions of the rails 301 by the piston rod of a double acting cylinder 313 which is pivotally supported on the carriage 308 at one end thereof at 314, said cylinder having ports 316 and 317 through which actuating pressure fluid is admitted and exhausted. The piston rod of cylinder 313 is connected to the mold 310 at 315.

As shown in detail in FIGS. 21 and 23, the mold 310 is relatively deep and of multipartite construction, the component 318 having hollow side walls, and the components 319 and 320 together providing a hollow bottom. The inner faces of the side walls of the mold 310 are sloped downwardly and inwardly at a slight angle to the vertical as at 321 and merge through small radius curvatures at 322 with the top surface of an inset 323 affixed to the top of compartment 319, said surface being convexly rounded upward on a curvature of large radius. Adjacent their top edges, the inner surfaces of the side walls of the mold are more sharply inclined as at 324 and terminate in short vertical portions 325.

Engaged in holes 326 in the corner regions of the bottom of the mold are ejector plungers 327 (see FIGS. 23 and 24) which are flared adjacent their tops to fit snugly into tapered counterbores at the upper ends of the holes 326, and which terminate in conical tips. Piston heads 330 at the bottom ends of the plungers 327 are engaged in cylinders 331 which, by means of screws 332, are adjustable in guides 333 affixed in the bottom of the mold 310. Actuating pressure fluid is conducted to and exhausted from the cylinders 331 by way of flexible tubes 334 and 335 which connect to corresponding ports of said cylinders and which are connected to pipes 336 and 337 connected in turn to a control valve 338 operable by means of a lever 339. Within the plungers 327 are ducts 342 which are in communication with ports 343 in the component 319 of the mold 310, said ports being connected to a pipe system 344 in communication with a supply source (not illustrated) of compressed air. As shown in FIG. 5, the valve 338 is mounted on a bracket projecting laterally from the standard 312.

In the modification illustrated in FIG. 27, the male die element 350 is provided in the corner regions with downwardly extending projections and the heads of the ejecting plungers 327' are provided with correspondingly configured depressions in their tops.

Anchored in and projecting downward from the head 302 of the finishing press are studs 345 on which are mounted springs 347 for supporting rectangular plate 346.

For cooperation with the mold 310, which for the purposes of illustration is shown in the drawings as a female die element, there is a hollow male die element 350 which is rigidly suspended from the head 302 by hanger studs 351. The male die element 350 is formed complementally to the mold 310 and has a perimetric flange 352 at its top, the bottom of said flange being stepped as at 353 in conformance with the stepping of the upper die element 119 of the preform press 32. The outer side wall faces of the die element 350 are substantially uniformly spaced from the inner side wall faces of the mold 310, and are rounded at 354 on a radius somewhat smaller than that at 322 of the mold 310. The bottom of the die element 350 is upwardly concaved as at 355 on a curvature having a radius somewhat larger than that of the curvature 323 of the mold bottom.

A pair of suspension rods 356 and 357 fixedly connected at their upper ends to the plate 346 extend downwardly through holes in spaced brackets 358 and 359 at one side of the mold carriage 308, as shown in FIG. 5, and have stop nuts 360 and 361 threaded thereon at their bottom ends. Vertical cylinders 362 and 363, having ports 364, 365 at their tops, are secured to the head 302 of the press with the lower ends of their piston rods 368 and 369 connected to brackets 370 and 371 at opposite sides of the carriage 308. As the mold 310 is elevated to receive within it the male die element 350, as shown in FIG. 21, it is guided into axial alignment with die element 350 through engagement of upstanding dowels 372 at the corners of the mold 310 into apertures in spaced cross bars 373 secured to the top of the die element 350. Also affixed to the top of the die element 350, perpendicularly to bars 373, are spaced bars 374 (see FIGS. 2 and 21) in which are guided vertically reciprocable ejector plungers 375 having heads at their top ends, the lower ends of said plungers passing through the flange 352 of the die element 350 and being stepped at the tips as at 377. Interposed between the heads of plungers 375 and bars 374 are helical compression springs 376.

The male die element 350 is heated by passage of steam through its hollow, the steam entering through a hose 378 connected to an inlet fitting 379 and leaving through a hose 380 connecting into an outlet fitting 381 having a downward pipe extension 382.

*Controls for the Finishing Press*

For the description of this control, reference will be had to FIGS. 2, 5, 28 and 29 of the drawings. The pressure fluid used to operate the finishing press—which may be oil—is contained in a reservoir 385 and circulated by a motor-driven propulsion pump 386. Admission and exhaust of the pressure fluid to and from the ram cylinder 305 of the press is controlled by a valve 387 which is operable by means of a lever 388. Leading from the pump 386 is a pipe 389 with a branch pipe 390 extending to the auxiliary valve 391 having a channelled plunger 392 adapted to be actuated by a solenoid 393. Extending from the valve 391 to the valve 387 is a pipe 394, and extending from the valve 387 is a pipe 395 which is connected to another auxiliary valve 396 having a channelled plunger 397 adapted to be actuated by a solenoid 398, said valve 396 being in communication with the port 306 of the ram cylinder 305 by way of a pipe 399. Extending from the valve 387 is a pipe 400 having branch pipes 401 and 402 connected into the upper ports 364 and 365 of the cylinders 362 and 363, respectively. The valve 387 is also connected to the auxiliary valve 391 by the pipe 403, and to the auxiliary valve 396 by the pipe 394 and the branch pipe 404.

The operation of the mold shifting cylinder 313 is controlled by a separate valve 405 which is operable by means of a lever 406 and connected to the end ports 316 and 317 of said cylinder by pipes 407 and 408, respectively. The valve 405 is in communication, by way of a pipe 409, with another auxiliary valve 410 having a channelled plunger 411 operable by a solenoid 412, said valve also being connected to the valve 405 by a pipe 413 and to the pump 386 by pipes 414 and 389. As further shown, the pipes 394, 404 and 413 are connected by a pipe 415 having a branch pipe 416 discharging into the reservoir 385. Interposed in a by-pass 417 between the pipes 395 and 399 is a check valve 418 which functions for a purpose later explained.

Embodied in the control system is a switch 420 which, as shown in FIG. 5, is mounted on the carriage 308 of the finishing press and is arranged to be actuated by a lug 421 on the mold 310, a second switch 422 mounted on the base 301 of the press and arranged to be actuated by a projection 423 at the top of the ram piston 307 and a third switch 425 also mounted on the base 301 of the press and arranged to be actuated by a projection 426 on the piston rod 369 of the cylinder 363. For convenience, the valves 387 and 405 are located in a cabinet or desk 427 (FIG. 2) mounted on the platform 300 adjacent the finishing press.

*Finishing Press Operation*

When the finishing press is open and the mold 310 is positioned in the broken line position of FIG. 5, the control system is in the dormant condition of FIG. 28, with the switch 420 open and the switches 422 and 425 closed. Since the switch 422 is closed at this time, current will flow through the circuit 430, 431, 432, 433, 434 containing the coil of solenoid 398 which is therefore energized to keep the plunger 397 of the auxiliary valve 396 positioned as shown in FIG. 28. Since the switch 425 is likewise closed at this time, current will flow in a branch circuit 430, 435, 436, 437, 438, 434 containing the solenoid 412 of auxiliary valve 410 of which the plunger 411 will be maintained in the position shown in FIG. 28. Under these conditions, the pressure fluid will be circulated by the pump 386 through the pipes 389, 390, auxiliary valve 391, pipes 394, 404, 415 and 416 back to the reservoir 385.

In the illustration shown, in preparing for a finishing press operation, four dried wall preforms A are first placed in mold 310, as shown in FIG. 25, with the tapered rounded side edge margins *a* of each wall preform interlapping with the contiguous correspondingly tapered rounded side edge margins *a* of the next adjacent wall preforms, as shown in FIG. 26. A bottom preform B is then inserted into the mold 310 with its tapered rounded peripheral margins *b'* lapped over the correspondingly-tapered and rounded bottom edge margins *a'* of the wall preforms. It is to be noted that the preforms are completely inserted within the mold 310 so that the whole of each preform is molded in the finishing press operation, thus avoiding wastage. After the preforms A and B are so placed, a measured quantity of resin R (see FIG. 25) is delivered to the mold 310. The control valve 405 is then operated by shifting its lever 406 to the position shown in dotted lines in FIG. 28, whereupon pressure fluid will be forced by the pump 386 through pipes 389, 414, valve 410, pipe 409, valve 405, pipe 407 and port 316 into the cylinder 313 to advance the mold 310 into the press. At the same time fluid exhausts to reservoir 385 from cylinder 313 through pipe 408, valve 405 and pipes 413, 415 and 416.

Upon reaching its centralized position in the press, as shown in FIG. 5, the mold will close the switch 420 to establish the branch circuit 435, 439, 440, 441 containing the solenoid 393 of auxiliary valve 391, which solenoid will thereby be energized to shift the slide of said valve to the position shown in FIG. 29. The control valve 387 is next operated by its lever 388 to shift its slide to the position shown in FIG. 29 whereby pressure fluid will be forced by the pump 386 through the pipes 389, 390, auxiliary valve 391, pipe 403, valve 387, pipe 395, valve 396 and pipe 399 into the ram cylinder 305 to start raising the ram piston 307 and the carriage 308 supporting the mold 310. As the mold rises the springs 347 lift the plate 346 into contact with the bottom face of the press head 302, as shown in FIG. 21.

The valve 396 permits full pressure of the fluid to be brought to bear against the ram piston 307 at the time of its initial rise. Immediately upon start of the rise of the ram piston 307, switches 422 and 425 are opened automatically. By opening of the switch 422, the circuit through the solenoid 398 of auxiliary valve 396 is broken and the slide 397 of the valve 396 shifts to the position shown in FIG. 29, the fluid thereafter passing through check valve 418 before entering the ram cylinder with consequent retardation in the rise of the piston 307.

Opening of the switch 425, on the other hand, results in breaking the circuit through the actuating coil 412 of valve 410, so that the slide 411 shifts to the position shown in FIG. 29. Fluid in the upper ends of the cylinders 362 and 363 (of which the piston rods 368 and 369 are connected to the carriage 308 as shown in FIG. 2) is then forced back to the reservoir 385 by way of the pipes 401, 402, 400, valve 387 and pipes 394, 404, 415 and 416. As the mold 310 completes its upward travel, the dowels 372 thereon enter the openings in the bars 373 on the male die element 350, as shown in FIG. 21, thereby registering mold 310 in true axial alignment with male die element 350.

With the mold 310 fully raised, and the steam heated male die element 350 wholly received within it, as shown in FIG. 21, the preforms A and B are compressed to the final shape desired in the finished article and, at the same time, are integrated or bound along their regions of overlap as a result of uniform impregnation and heat setting of the resin throughout the preforms. After lapse of a time interval sufficient to properly heat set the resin, the lever 388 of control valve 387 is moved to the broken line position of FIG. 29 for admission of pressure fluid to the upper ends of the cylinders 362 and 363 through the pipes 389, 390, valve 391, pipe 403, valve 387 and pipes 400, 401, 402 to retract the mold 310. Concurrently, the fluid trapped in the ram cylinder 305 is permitted to flow back to the reservoir 385 by way of the pipe 399, valve 396 and pipes 404, 415 and 416. As the mold 310 completes its descent, the plate 346 is lowered, by the downward pull of the freely sliding brackets 358, 359 against the nuts 361, 362 of the rods 356, 357 (see FIGS. 2, 5, 21), against the resistance of the springs 347, and the ejecting plungers 375 are thereby depressed to doff the finished article from the male die element 350 into the mold 310. As the ram piston reaches its lowest position, the switches 422 and 425 are closed, respectively, by the projection 423 on said piston and by the projection 426 on the piston rod of the cylinder 363, with the result that the valves 396 and 410 will be restored to their normal positions shown in FIG. 28.

The valve 406 is next shifted back to the normal full line position of FIG. 28, permitting pressure fluid to flow through the pipes 389, 414, valve 410, pipe 409, valve 405, pipe 408 and port 317 into the cylinder 313 whereby the mold 310, with the finished product therein, is shifted back to its starting position shown in broken lines in FIG. 5. As the mold 310 starts to retract, the switch 420 is opened, as shown in FIG. 28, thereby breaking the circuit through the actuating coil 393 of valve 391 whereupon its plunger 392 re-assumes its normal position.

With the mold 310 back in its starting position, the valve 338 (see FIGS. 5 and 23) is operated by means of its lever 339 for admission of compressed air into the bottoms of the cylinders 331 in the lower part of the mold 310 by way of the pipe 335 (see FIGS. 23 and 24) to raise the plungers 327 for dislodgement of the finished article so that it may be easily removed from the mold 310. To aid the dislodging action, compressed air is also passed through the pipe 344, through the ducts 342 in the raised plungers 327 and past the heads thereof to exit through the holes 326. After the finished article is removed from the mold 310, the valve 338 is shifted back to the normal position shown in FIG. 23 for admission of compressed air into the upper ends of the cylinders 331 from pipes 334 whereby the displacing plungers 327 are depressed to the retracted positions shown in FIG. 24.

It is to be understood that the modified plungers 327' in FIG. 27 will be actuated to function in the same manner as that set forth above in respect of the plungers 327.

It is to be noted particularly that, due to the particular shaping of the preforms A, B and B' and the overlapping of their rounded margins, the junctures at the corners of the finished products are thickened and, as a result, are effectively reinforced and strengthened against rupture by impact. It will also be observed that the character of the perimetric grooving around the open ends of the finished hollow sections S and S' in FIG. 30 is such as to provide for the accommodation of a sealing gasket 440 and a metallic inset 441 which may be permanently secured to one section to serve as a means to keep the two sections in registry when assembled in reverse relation to form a container.

By provision of the corner projections $b^3$ in the base of one section and the corner indentations $b^2$ in the base of the mating section, the containers may be interlocked when stacked one upon another, as shown in FIG. 30. In practice, spring clasp devices 442, as shown in FIG. 30, may be provided to keep the two sections of each container in assembled relation. For convenience in handling the containers, one section may be provided at opposite sides with bale-like lift handles 443.

*Alternate Slurry Preparation*

In FIG. 31 is shown a diagrammatic view of a modified metering means for the preform press 32 which may be used in the practice of my invention. Such modified metering means includes a batch metering vessel 35' having an outlet valve 107' at the bottom thereof arranged to be opened and closed by a double acting pressure fluid cylinder 108'. A cutting device 55' is arranged to draw individual rovings or strands G' of inorganic material from a supply source (not shown) and sever them into short staple or fibers, the fibers so cut dropping into the vessel 35'. A second cutting device 500 is similarly arranged to draw individual rovings or strands C of organic material from a supply source (not shown) and sever them into short staple or fibers, such fibers also dropping into the vessel 35'. The quantities of inorganic and organic fibers delivered by the cutting devices 55' and 500 are controlled by counters similar to the counter 73 shown in FIGS. 7 and 8.

Controlled quantities of a fluid medium are delivered to the vessel 35' through a conduit 501 having interposed therein a valve 502 arranged to be opened and closed by a double acting pressuring fluid cylinder 503. The vessel 35' may be formed with a lateral off-set having a float therein for actuating a switch in an electric circuit for opening and closing the valve 502, such arrangement being similar to that associated with the vessel 35, as shown in FIGS. 1 and 6. Thus, when a predetermined quantity of fluid has been admitted into the vessel 35', valve 502 will be closed to shut off further fluid flow. Through controls similar to those shown in FIGS. 1 and 8, the cutting devices 55' and 500 will be started to deliver fibers to the vessel 35' when the valve 502 is opened.

The slurry charge prepared in the vessel 35' from the mixture of the inorganic and organic fibers with the fluid is maintained in a continuous state of agitation by passing compressed air upwardly therethrough from jet tubes 99' connected to the tapered bottom of the vessel 35'.

When the valve 107' is opened, the slurry batch is discharged from the vessel 35' through the swivel spout 113' into the felting cylinder 120 of the preform press 32. A conduit 504 having a flexible hose 504a and a valve 505 interposed therein is arranged to mix additional controlled quantities of the fluid medium, or controlled quantities of a different fluid medium, if desired, with the slurry as it discharges through the swivel spout 113'. Valve 505 is arranged to be actuated by a double acting pressure fluid cylinder 506. Valves 107' and 505 are preferably opened simultaneously so that a complete mixing of the slurry and fluid may take place in the spout 113', and are actuated by control means similar to the control means shown in FIG. 1 for actuating the valve 107. The flexible hose section 504a in the conduit 504 permits the spout 113' to be swivelled about its vertical axis to a retracted position during closing of the preform press.

It is within the scope of my invention to use a gaseous medium, such as air, for the slurry fluid. Where air is so used, the metering unit shown in FIG. 31 would be particularly adaptable. In such case, the conduit 501 would not be used, and only fibers cut from the strands C, G would be delivered into the vessel 35'. Compressed air from the tubes 99' would agitate the fibers and intermix them to form a homogeneous fibrous mass in the vessel 35'. The fibrous mass would be delivered to the cylinder 120 of the press 32 by the spout 113' when the valve 107' or other appropriate discharge means in the vessel 35' is opened.

It is also within the scope of my invention to use a liquid thermosetting resin for the slurry fluid. In such case, it would not be necessary to dry the preforms; they would be ready for the finishing operation in the finishing press immediately upon their delivery from the preform press.

It is also possible to use a resin solution for the slurry fluid, but in such case the suspension medium would have to be removed from the preform prior to the finishing operation.

From the foregoing, it is obvious that I have provided substantial improvements in the molding of articles from fluid fibrous suspensions. My invention is adaptable to the production of countless articles having single or multiple sections or components, and permits the molding of complex structures from fluid fibrous suspensions wherein non-uniform sections will be formed with uniform density and composition throughout.

It is to be clearly understood that the terms and expressions used herein are employed as terms of description, and not of limitation, and that there is no intention in using such terms and expressions to exclude any equivalents of the apparatus or procedures described. It is also to be clearly understood that the specific apparatus and methods shown and described herein represent preferred embodiments only of my invention, and that various changes and equivalents may be resorted to without departing from the spirit of my invention or the scope of the claims hereof.

Having thus described my invention, I claim:

1. A process for the production of preforms, composed of organic and inorganic fibers and having all sections thereof, whether of uniform or non-uniform thickness, of uniform density and composition, by pressure forming means having slurry compressing elements comprising
    (a) mixing a carrier fluid with organic fibers to provide a pulp,
    (b) measuring out a quantity of said pulp,
    (c) adding to the measured quantity of pulp a predetermined quantity of bundles of inorganic fibers to provide a batch of slurry sufficient for one preform,
    (d) immediately thereafter compressing the batch of slurry by the pressure forming means to remove the carrier fluid and produce a preform and
    (e) subjecting the batch of slurry, from its inception up to and including commencement of the slurry compressing operation, to mild agitation sufficient to maintain the organic fibers and the bundles of inorganic fibers uniformly dispersed throughout the slurry, without destroying the integrity of the bundles.

2. A process as claimed in claim 1 characterized in that said inorganic fibers are cut glass fibers, and in that said carrier fluid is an aqueous fluid, and in that said mild agitation is provided by injecting a gaseous medium into the batch.

3. A process as claimed in claim 2 further characterized in that said organic fibers are cellulose fibers, and in that said gaseous medium is air.

4. A process as claimed in claim 1 further characterized in that a separate batch of slurry is provided for each individual preform, and in that each separate batch is prepared during the period that the previous batch is being compressed.

5. A process as claimed in claim 1 further including the steps of delivering the measured quantity of pulp to a mixing vessel and adding the bundles of inorganic fibers to the pulp as it is delivered to the vessel.

References Cited in the file of this patent

UNITED STATES PATENTS

| | | |
|---|---|---|
| 432,379 | Deering | July 15, 1890 |
| 1,690,528 | Bushnell | Nov. 6, 1928 |
| 2,105,593 | Hatton | Jan. 18, 1938 |
| 2,321,574 | Chaplin | June 15, 1943 |
| 2,619,012 | Brennan | Nov. 25, 1952 |
| 2,693,740 | Cooper | Nov. 9, 1954 |
| 2,698,558 | Hawley | Jan. 4, 1955 |
| 2,859,109 | Hawley | Nov. 4, 1958 |
| 2,944,930 | Bush | July 12, 1960 |

FOREIGN PATENTS

| | | |
|---|---|---|
| 553,118 | Great Britain | May 7, 1943 |

OTHER REFERENCES

Fiberglass published by Owens Corning Fiberglass, Toledo, Ohio, 1954, pp. 12–14.

UNITED STATES PATENT OFFICE
CERTIFICATE OF CORRECTION

Patent No. 3,127,307                                     March 31, 1964

Serenus H. A. Young

It is hereby certified that error appears in the above numbered patent requiring correction and that the said Letters Patent should read as corrected below.

In the grant, lines 2 to 6, for "assignor, by direct and mesne assignments, of seventy-nine and three-tenths percent to J. J. Griffin, substitute trustee of the trust for the benefit of various assignees, as tenants in common, and twenty and seven-tenths percent to Pressurform Container Corporation, a corporation of Oklahoma," read -- assignor, by direct and mesne assignments, of forty-one and four-tenths percent to J. J. Griffin, of Oklahoma City, Oklahoma, substitute trustee of the trust for the benefit of Monte H. Goldman and Alfred D. Goldman, twenty and seven-tenths percent to Pressurform Container Corporation, a corporation of Oklahoma, sixteen and seventy-seven-hundredths percent to David E. Kahn, of New York, N. Y., sixteen and seventy-seven-hundredths percent to Herbert L. Weisburgh, of Bedford Village, New York, three and eleven-hundredths percent to Jesse N. Okawa, of Philadelphia, Pennsylvania, and one and twenty-five-hundredths percent to Ernest R. Rosenberg, of Greenwood, South Carolina, --; lines 15 to 17, for "J. J. Griffin, as substitute trustee of the trust for the benefit of various assignees, his successors or assigns, and Pressurform Container Corporation, its successors" read -- J. J. Griffin, as substitute trustee of the trust for the benefit of Monte H. Goldman and Alfred D. Goldman, his successors or assigns, and Pressurform Container Corporation, its successors or assigns, and David E. Kahn, Herbert L. Weisburgh, Jesse N. Okawa, and Ernest R. Rosenberg, their heirs --; in the heading to the printed specification, lines 4 to 10, for "assignor, by direct and mesne assignments, of seventy-nine and three-tenths percent to J. J. Griffin, substitute trustee of the trust for the benefit of various assignees, as tenants in common, and twenty and seven-tenths percent to Pressurform Container Corporation, a corporation of Oklahoma" read -- assignor, by 3,127,307 direct and mesne assignments of forty-one and four-tenths percent to J. J. Griffin, Oklahoma City, Okla., substitute trustee of the trust for the benefit of Monte H. Goldman and Alfred D. Goldman, twenty and seven-tenths percent to Pressurform Container Corporation, a corporation of Oklahoma, sixteen and seventy-seven-hundredths percent to David E. Kahn, New York, N. Y., sixteen and seventy-seven-hundredths percent to Herbert L. Weisburgh, Bedford Village, N. Y., three and eleven-hundredths percent to Jesse N. Okawa, Philadelphia, Pa., and one and twenty-five-hundredths percent to Ernest R. Rosenberg, Greenwood, S. C. --.

Signed and sealed this 13th day of October 1964.

(SEAL)
Attest:

ERNEST W. SWIDER
Attesting Officer

EDWARD J. BRENNER
Commissioner of Patents